US012226706B2

(12) United States Patent
Santos, Jr.

(10) Patent No.: US 12,226,706 B2
(45) Date of Patent: Feb. 18, 2025

(54) APPARATUS AND METHOD FOR PLAYING MODIFIED CHESS GAME WITH PLAYERS OF DIFFERENT PROFICIENCY LEVELS

(71) Applicant: Arsenio P. Santos, Jr., Beaverton, OR (US)

(72) Inventor: Arsenio P. Santos, Jr., Beaverton, OR (US)

( * ) Notice: Subject to any disclaimer, the term of this patent is extended or adjusted under 35 U.S.C. 154(b) by 118 days.

(21) Appl. No.: 17/958,798

(22) Filed: Oct. 3, 2022

(65) Prior Publication Data

US 2023/0107656 A1    Apr. 6, 2023

Related U.S. Application Data

(60) Provisional application No. 63/251,780, filed on Oct. 4, 2021.

(51) Int. Cl.
*A63F 3/02* (2006.01)
*A63F 13/798* (2014.01)
*A63F 13/822* (2014.01)

(52) U.S. Cl.
CPC ............. *A63F 3/02* (2013.01); *A63F 13/798* (2014.09); *A63F 13/822* (2014.09)

(58) Field of Classification Search
CPC ...... A63F 3/02; A63F 3/00214; A63F 3/0023; A63F 3/00261; A63F 3/0052;
(Continued)

(56) References Cited

U.S. PATENT DOCUMENTS

| 4,398,720 A | 8/1983 | Jones et al. |
| 5,421,482 A | 6/1995 | Ritter |

(Continued)

FOREIGN PATENT DOCUMENTS

| CN | 209696256 U | 11/2019 |
| CN | 212308848 U | 1/2021 |

(Continued)

OTHER PUBLICATIONS

Michael Atherton, Jiancheng Zhuang, William M Bart, Xiaoping Hu, Sheng He, A functional MRI study of high-level cognition. I. The game of chess, Cognitive Brain Research vol. 16, Issue 1, Mar. 2003, pp. 26-31, The United States of America.

*Primary Examiner* — Lawrence S Galka
(74) *Attorney, Agent, or Firm* — Evergreen Valley Law Group; Kanika Radhakrishnan

(57) ABSTRACT

Embodiments of the present disclosure disclose an apparatus and method for playing modified chess game. The apparatus includes an expandable game to operate between a conventional mode and a powered mode. The apparatus further includes two sets of playing pieces, visually distinguished from each other are configured to operate in the conventional mode. The at least two bishops, the at least two knights, the at least two rooks, and the at least eight pawns of at least one set of the two sets of playing pieces are provided with a toggle switch. The toggle switch is adapted to form corresponding powered playing pieces during the modified chess game. The powered playing pieces are operated based on a set of powered rules. The apparatus further includes a power zone provided on a portion of the expandable game board to regulate movement of the powered playing pieces in the powered mode.

23 Claims, 15 Drawing Sheets

(58) Field of Classification Search
CPC .......... A63F 3/00643; A63F 2003/0022; A63F 2003/00217; A63F 2003/00662; A63F 2003/00665; A63F 2003/00668; A63F 2003/00671; A63F 2003/00675; A63F 2003/00826; A63F 2003/00829; A63F 2003/00842; A63F 2003/00835; A63F 2003/00996
See application file for complete search history.

(56) References Cited

U.S. PATENT DOCUMENTS

| | | | | |
|---|---|---|---|---|
| 5,511,793 | A | * | 4/1996 | Watt .................... A63F 3/00697 273/261 |
| 5,690,334 | A | | 11/1997 | Duke |
| 5,749,583 | A | * | 5/1998 | Sadounichvili ........... A63F 3/02 273/284 |
| 6,702,287 | B1 | * | 3/2004 | Pendexter ................ A63F 3/02 273/261 |
| 9,795,867 | B1 | | 10/2017 | Hughes |
| 2005/0179203 | A1 | | 8/2005 | Schroeder et al. |
| 2006/0113728 | A1 | * | 6/2006 | Budden .................... A63F 3/02 273/260 |
| 2010/0072703 | A1 | * | 3/2010 | Samaniego ............... A63F 3/02 273/261 |
| 2015/0011284 | A1 | * | 1/2015 | Costa .................. A63F 3/00643 463/14 |
| 2018/0178113 | A1 | | 6/2018 | Zwiffer et al. |
| 2019/0022517 | A1 | | 1/2019 | Socorregut |

FOREIGN PATENT DOCUMENTS

| | | |
|---|---|---|
| IN | 202121000586 | 3/2021 |
| WO | 2009122376 A2 | 10/2009 |

* cited by examiner

APPARATUS AND METHOD FOR PLAYING MODIFIED CHESS GAME WITH PLAYERS OF DIFFERENT PROFICIENCY LEVELS

TECHNICAL FIELD

The present disclosure relates to chess game and, more particularly relates, to an apparatus and method for playing modified chess game with players of different proficiency levels.

BACKGROUND

Chess is a board game to be played by two players. Chess game is a well-known game that is being played for hundred or even more than a thousand years. By rule, each piece in the conventional chess game has limitations placed upon its movement. In the conventional chess, other variant moves are permitted under limited circumstances, such as "castling" moves and "en passant" capture moves. Oftentimes, the conventional game of chess requires two players of equal skills to complete the game with equal enthusiasm and fun.

Nowadays, this game is even more famous, and is mostly played for entertainment purposes and for championships. The game can be played between players having unequal skills. For example, players of unequal strength such as parent versus child, beginner versus advanced player, or among masters of varying skills and even between computers versus humans, can also be played.

When players of varied proficiency levels play together, the player at a beginner level tends to lose the game constantly to the stronger opponent. Eventually, eagerness to advance in the game stalls prematurely. Likewise, more advanced players avoid engaging weaker players for lack of mental stimulation thus, giving up chess too soon as well. In addition, the player needs to engage his/her hands continuously for moving and/or capturing the opponent's pieces during the game.

Further, due to the complex rules and strategies which are employed by chess players attempting to checkmate the opposing player's King, it often takes years of study and continuous practice playing the conventional chess before advancing in skill levels from beginner, to expert, then masters to international master up to super grandmasters. For this, players need to be physically engaged with the game. Although conventional chess and some of its variations have achieved notoriety and respect from fans and players alike, a need exists for a new and improved chess variant that enables players with vastly separated skill ratings to experience a mutually satisfying game.

SUMMARY

In order to solve the foregoing problem and to provide other advantages, one aspect of the present disclosure is to provide an apparatus for playing a modified chess game with players of different proficiency levels. The apparatus includes an expandable game board including an expandable game board configured to operate in at least one of a conventional mode and a powered mode. Two sets of playing pieces, visually distinguished from each other, are configured to be mounted at the expandable game board. A switching member is configured in at least one playing piece of the two sets of playing pieces to convert the playing piece to a powered playing piece in the powered mode. A power zone is provided on a portion of the expandable game board to regulate movement of powered playing pieces based on a set of powered rules.

In an aspect, the expandable game board includes at least eight files and at least eight ranks, adapted to form a set of equally spaced, alternatingly patterned squares. In an aspect, the expandable game board is adapted with an expansion mechanism configured to alter number of at least one file, at least one rank, or any combination thereof.

In an aspect, each set of playing pieces includes one king, one queen, at least two bishops, at least two knights, at least two rooks, and at least eight pawns. In an aspect, at least two bishops, the at least two knights, the at least two rooks, and the at least eight pawns of at least one set of the two sets of playing pieces include the switching member. The switching member includes an indicator for indicating the powered playing piece; and a toggle switch, activated to expose the indicator in the powered mode.

In an aspect, the powered playing pieces of the apparatus are operated based on the set of powered rules by: allowing the powered bishop to move and/or capture a second adjacent orthogonal square of same color/pattern located with respect to original position of the powered bishop; restricting the powered bishop to move and/or capture a first adjacent orthogonal square of the opposite color/pattern located with respect to original position of the powered bishop; allowing the powered knight to move and/or capture the first adjacent orthogonal square of the opposite color/pattern located with respect to original position of the powered knight; allowing the powered knight to move but restricting to capture the second adjacent orthogonal square of the same color/pattern located with respect to original position of the powered knight; allowing the powered pawn to move and/or capture one of the pawns of opposite player, located at first square adjacent sideways with respect to original position of the powered pawn; and restricting the powered pawn playing piece to capture the playing pieces other than the pawn of the opposite player.

In an aspect, each playing piece includes: a sensing element for sensing the physical movement of the playing piece mounted on the expandable game board; and a network unit for transmitting the sensed physical movement of the playing piece to the electronic device. The position of the playing piece displayed on the electronic device is updated based on the sensed physical movement.

In an aspect, a method for playing a modified chess game with players of different proficiency levels is disclosed. The method includes setting a level of playing the modified chess game to at least one or combination of full or partial conventional and/or powered mode. The method further includes configuring an expandable game board based on the level set by the player. Furthermore, the method includes mounting two sets of playing pieces visually distinguished from each other on the expandable game board. The method further includes configuring a switching member in at least one playing piece of the two sets of playing pieces, to convert the playing piece to a corresponding powered playing piece. Moreover, the method includes providing a power zone on a part of the expandable game board for regulating the movement of the powered playing pieces in the powered mode. The method further includes setting powered rules to operate the powered playing pieces in the power zone based at least on the set level.

In an aspect, the method for playing a modified chess game is disclosed, wherein each set of playing pieces includes one king, one queen, at least two bishops, at least two knights, at least two rooks, and at least eight pawns.

In an aspect, the method for playing a modified chess game is disclosed, wherein at least two bishops, the at least two knights, the at least two rooks, and the at least eight pawns of at least one set of the two sets of playing pieces include the switching member. The switching member includes an indicator for indicating the powered playing piece and a toggle switch, activated to expose the indicator in the powered mode.

In an aspect, the method for playing a modified chess game further includes configuring each playing piece of the at least two bishops, the at least two knights, the at least two rooks, and the at least eight pawns of at least one set of the two sets of playing pieces with a toggle switch and activating the toggle switch to expose the indicator in the powered mode.

In an aspect, the method for playing a modified chess game further includes, operating at least one of the two sets of playing pieces remotely, to play the modified chess game using at least one electronic device.

In an aspect, the method for playing a modified chess game further includes, remotely controlling, by a controller of at least one of the two sets of playing pieces, at least one physical movement of the playing piece mounted on the expandable game board based on at least one remote movement of the playing piece performed on the electronic device.

In an aspect, the method for playing a modified chess game further includes, sensing, by a sensing element of at least one of the two sets of playing pieces, the physical movement of the playing piece mounted on the expandable game board; and transmitting, by a network unit of at least one of the two sets of playing pieces, the sensed physical movement of the playing piece to the electronic device. The position of the playing piece displayed on the electronic device is updated based on the sensed physical movement.

In an aspect, the method for playing a modified chess game further includes, setting the powered rules to operate the powered bishop including: allowing the powered bishop to move and/or capture a second adjacent orthogonal square of same color/pattern located with respect to original position of the powered bishop; and restricting the powered bishop to move and/or capture a first adjacent orthogonal square of the opposite color/pattern located with respect to original position of the powered bishop.

In an aspect, the method for playing a modified chess game further includes, setting the powered rules to operate the powered knight including allowing the powered knight to move and/or capture the first adjacent orthogonal square of the opposite color/pattern located with respect to original position of the powered knight; and allowing the powered knight to move but restricting to capture the second adjacent orthogonal square of the same color/pattern located with respect to original position of the powered knight.

In an aspect, the method for playing a modified chess game further includes, setting the powered rules to operate the powered pawn including allowing the powered pawn to move and/or capture one of the pawns of opposite player, located at first square adjacent sideways with respect to original position of the powered pawn; and restricting the powered pawn playing piece to capture the playing pieces other than the pawn of the opposite player.

In an aspect, the method for playing a modified chess game, wherein the powered rules to operate the powered rook loses the power to capture when moving like the rook, but gains the conventional knight and bishop movements. In an aspect, the method for playing a modified chess game, wherein the king retains the movement of the conventional mode and not threatened/checkmated by the powered playing pieces of the opposite player.

In an aspect, the method for playing a modified chess game, wherein the queen retains the movement of the conventional mode and is immune from capture by the powered knight and the powered bishop of the opposite player. In an aspect, the method for playing a modified chess game, wherein the two set of playing pieces other than the king and the queen, captures only while entering or leaving from the power zone.

In an aspect, the method for playing a modified chess game, wherein the powered bishop and the powered knight are allowed to move, but not allowed to capture outside the power zone. In an aspect, the method for playing a modified chess game, wherein, in the power mode, the playing pieces other than the powered playing pieces operate in the conventional mode.

An advantage of various embodiments of present disclosure is to provide a new variant of the traditional game of chess with additional tactics and strategy while improving and sharpening the skills to play conventional chess. Another advantage of various embodiments of present disclosure is to provide a new variation of the game of chess that makes chess exciting and engaging even for players of unequal strength. Further, the present disclosure enables abrupt change in the conduct of the game during the play by altering the game board dimension making it more difficult for chess computers to defeat humans. The modified chess apparatus of present disclosure is portable, and inexpensive to manufacture.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
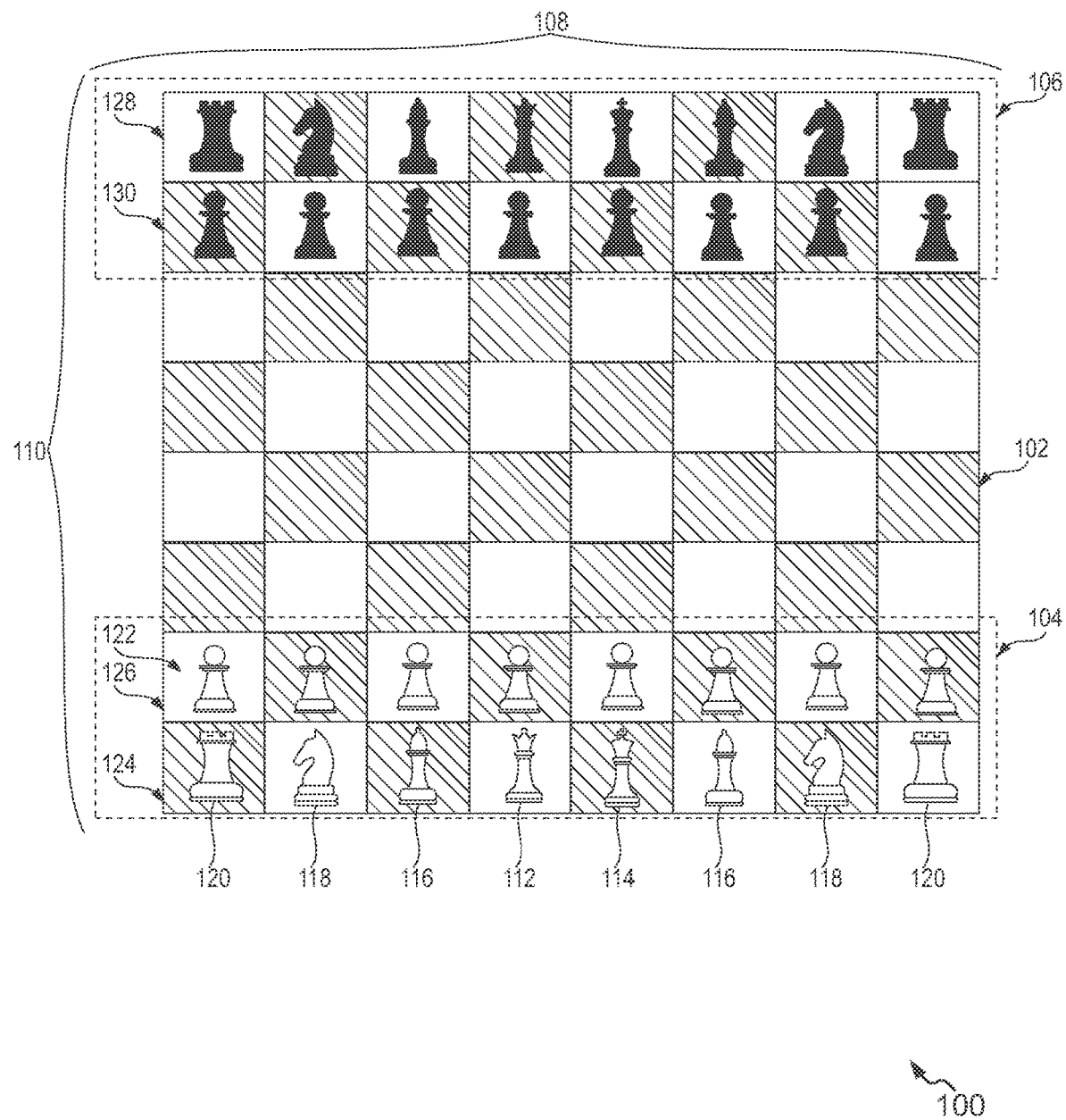
FIG. 1 illustrates a schematic diagram of an apparatus for playing a modified chess game, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various examples of the present disclosure provide an apparatus for playing a modified chess game with players of different proficiency levels. The apparatus includes an expandable board game adapted to mount two sets of playing pieces, to be played by two players. The modified chess game can be played manually and/or electronically by the players. The expandable board game is designed in a manner to alter one or more ranks (rows), one or more files (columns), or a combination of one or more ranks and one or more files via an expansion mechanism disposed within the expandable board game. A power zone is constructed at least in a part of the expandable board game for altering the power capability to move and/or capture one or more playing pieces of a set of the playing pieces.

In the power zone, the additional move and/or capture capability is provided to conventional playing pieces viz. at least two bishops, at least two knights, at least two rooks, and at least eight pawns of the set of playing pieces. However, playing pieces viz. a king and a queen do not possess powered mode, and always move in the conventional mode irrespective of the proficiency level of the game. The conventional playing pieces that attain additional power are referred to as powered pieces. The powered pieces may use additional move and/or capture capability in the power zone and/or in the conventional zone of the extendable board game, based on the powered rules specified for powered bishop, powered knight, powered rook, and the powered pawns. In addition, the powered rules of these powered pieces decided in the conventional zone and the power zone also depend upon the proficiency levels chosen by the players. The proficiency levels of the modified chess game can be chosen by the players based on the skill of the players.

Alteration of at least two bishops, at least two knights, at least two rooks, and at least eight pawns of at least one set of the playing pieces from the conventional mode to the powered mode take place using a toggle switch of the switching member. The toggle switch disposed within the body of the playing piece changes its geometrical configuration. The alteration of the playing piece from the conventional mode to the powered mode can be done before the start of the game or during the game. The toggle switch includes at least one of a push button and a threaded arrangement adapted to extract/retract the playing piece. When the playing piece is extracted through the toggle switch, a color band hidden within the body of the playing piece gets exposed, indicating the playing piece is operating in the powered mode. Alternatively, when the playing piece is retracted through the toggle switch, the color band hides within the body of the playing piece, indicating the playing piece is operating in the conventional mode. Further, the playing piece is formed with a cavity to accommodate a shift weight. The shift weight is made up of a suitable material, like mild steel having superior ductility and toughness, and arranged in a manner to prevent cracking of the powered playing piece while toggling between the conventional mode and the powered mode, and ensures proper weight distribution and balance of the powered playing piece.

In order to play the game, one or more steps may be grouped and performed in the form of a single step, or one step may have several sub-steps that may be performed in parallel or a sequential manner. The steps include a set level of the game modified chess game based on the skill of the players. In one example, the first player may choose full powered mode and the second player may choose full conventional mode. Based on this, the first player can use the powered mode of the playing piece viz. the bishop, the knight, the rook, and the pawn in the power zone, while the second player needs to play the modified chess game as per conventional rule only. Further, based on the chosen levels, the players decide the size of the expandable game board. For example, the players may choose to play the modified chess game on the expandable game board having eight ranks (rows) and nine files (columns), i.e. 8×9 expandable game board. Further, each set of playing pieces is provided to the players. Based on the powered mode chosen by the first and/or the second player, the conventional pieces are altered into the powered pieces using the switching member. This step can also be performed while playing the game. Further, the power zone is provided on the part of the expandable game board for regulating the movement of the powered pieces in the powered mode. Afterward, powered rules are set for providing additional power to the powered playing pieces based on the level chosen by the players.

For the purpose of this application, the following definitions may be employed. For the purpose of this disclosure, the following definitions of the terms should be taken in a larger scope in a non-limiting manner.

The term "expandable game board" refers to a conventional chess board that can be extracted/retracted to alter one or more ranks (rows) and/or files (columns).

The term "playing pieces" or "conventional playing pieces" or "conventional pieces" refers to chess pieces that operate based on the conventional rules of the chess game (standard).

The term "powered playing pieces" or "powered pieces" refers to chess pieces that possess additional move and/or capture capability in addition to conventional move and/or capture capability. Some of the powered pieces get rook movement in the power zone.

The term "Conventional rules", also referred to as "conventional mode movements" of the chess game is the standard rules to be followed while playing the chess game. In the conventional rule, the bishop can move only in diagonally oriented squares of the same color/pattern with respect to the current position of the square over which the bishop is mounted. The knight can move only in an 'L-shape' arrangement of squares. The L-shape move of the knight includes a combination of a first step and a second step. In the first step, the knight moves in one of the second adjacent orthogonal squares (i.e. front square, back square, right square, or left square). In the second step, the knight moves in one of the first adjacent right or left squares located orthogonally with respect to the position of a square acquired after the first step. The rook can move only along the orthogonal squares (i.e. front squares, back squares, right squares, and left squares) with respect to the current position of the square over which the rook is mounted. The queen possesses the moves of both the rook and the bishop described above. The king can move in any of the first adjacent squares with respect to the current position of the square over which the king is mounted. The pawn can move in the adjacent front square and can move to the adjacent diagonal square to capture the opponent piece. In case of its first move, it can move up to two squares, at the front instead of one.

The term "Powered rules" of the chess game is additional rules to operate the powered pieces in addition to conventional rules.

The term "Conventional mode" of the chess game is the zone of the chess board where standard playing rules are applied.

The term "Powered mode" refers to the powered pieces operating in the power zone of the chess board.

The term "Conventional zone" is a part of the chess board where standard playing rules are applied. In case the player selects full conventional level, then the entire board will act as a conventional zone for that player. In case the player selects full or partial power level, then only a part of the board will act as a conventional zone to that player.

The term "Power zone" is a part of the chess board other than the conventional zone, where powered rules are applied.

The term "switching member" refers to a member in each of the playing pieces, used to indicate the powered playing piece in powered mode. The switching member includes a toggle switch, an indicator, or both. The indicator can be a band or a sticker that is used to differentiate the powered playing pieces from the standard playing pieces. The toggle switch of the switching member can be activated to expose the indicator in powered mode.

Various example embodiments of the present disclosure are described hereinafter with reference to FIG. 1 to FIG. 15.

FIG. 1 illustrates a schematic diagram of an apparatus 100 for playing a modified chess game, in accordance with an embodiment of the present disclosure. The apparatus 100 includes an expandable game board 102 (also referred to as 'game board' or 'chess board') provided with two sets of playing pieces 104 and 106. The expandable game board 102 is designed in a manner to be played by two players. Two sets of playing pieces 104 and 106, visually distinguished from each other are mounted on the expandable game board 102. Specifically, a set of playing pieces 104 (example, white colored) to be operated by a first player is mounted on a first side of the expandable game board 102, and a set of playing pieces 106 (example, black colored) to be operated by a second player is mounted on a second side of the expandable game board 102. In other words, the first playing pieces 104 of the first player and the playing pieces 106 of the second player are arranged opposite to each other on the expandable game board 102.

The expandable game board 102 includes a set of files (columns) 108 and a set of ranks (rows) 110 arranged in a manner to form a grid-like structure. In the present configuration, the expandable game board 102 includes the set of eight files 108 and the set of eight ranks 110 adapted to form a set of equally spaced, alternatingly colored, and patterned squares (that is, white and diagonal pattern) for mounting the set of playing pieces 104 and the set of playing pieces 106. The arrangement of alternatingly colored/patterned squares in the expandable game board 102 allows the players to play a chess game more easily without any confusion. For example, in a conventional chess game, alternatingly colored/patterned squares will easily allow the user of a bishop (positioned in a white square) of the set of playing pieces 104 to move diagonally along the white-colored squares, as per conventional chess rules. Similarly, a bishop (positioned in black square) of the set of playing pieces 104 can move diagonally along the patterned squares, as per conventional chess rules. In another embodiment, the alternatingly colored squares, alternatively patterned squares, or any combination thereof can be used in expandable game board 102.

In other configurations, the expandable game board 102 may include any number of files and ranks based on levels chosen by the players. In one embodiment of the disclosure, the expandable game board 102 can have alternatingly colored squares or patterns on one or both sides. For example, the first side of the expandable game board 102 can have eight files and eight ranks (i.e. 8×8 game board) and the second side of the expandable game board 102 can have eight files and nine ranks (i.e. 8×9 game board). However, it will be appreciated by those having ordinary skills in the art that the expandable game board 102 can include any suitable number of the files and the ranks. Other than this, an expandable mechanism can be disposed within the expandable game board 102, to alter the number of files and/or ranks, which is explained further in detail with respect to FIG. 3.

Further, as illustrated in FIG. 1, the set of the playing pieces 104 is visually distinguished from the set of the playing pieces 106 for ease of identification. In particular, the set of playing pieces 104 to be operated by the first player is formed with the white color and the set of playing pieces 106 to be operated by the second player is formed with the black color. Each set of the playing pieces 104 or 106 includes a plurality of playing pieces. Specifically, each set of the playing pieces 104 or 106 includes one king 114, one queen 112, at least two bishops 116, at least two knights 118, at least two rooks 120, and at least eight pawns 122. The plurality of playing pieces of the set 104 to be operated by the first player is mounted on the two ranks 124 and 126, and the plurality of the playing pieces of the set 106 to be operated by the second player is mounted on the last two ranks 128 and 130 of the expandable game board 102. It should be noted that the position of each of the playing pieces is decided based on the conventional rules decided for playing the chess game. For example, for the first player, the at least rooks 120 are positioned at extreme files of the rank 124, and each pawn is positioned on each square of the rank 128 of the expandable game board 102. Playing of chess game using the conventional rules is referred to as a conventional mode of the chess game.

In the modified chess game, the geometrical configuration of the at least two bishops 116, the at least two knights 118, the at least two rooks 120, and the at least eight pawns 122 of at least one set of the two sets of the playing pieces 104 and 106 is altered into the powered playing pieces through a switching member (shown in FIG. 10). The powered pieces receive extra power for moving and/or capturing the opponent's pieces in the power zone.

According to an embodiment, the expandable game board 102 is made of a flexible material like canvas. A set of squares formed on the flexible material should be of the same measurements in order to accommodate the playing pieces. According to another embodiment, the expandable game board 102 is made up of roll-up mats of vinyl and/or silicone material and may be single or double-sided, where the first side represents an 8×8 chessboard, and the second side represents an 8×9 chessboard. In yet another embodiment, the expandable game board 102 may be made of hard materials such as wood and plastic panels held by a perimeter of wood or suitable material and may also be reversible by sliding out, reversing the surface, and replacing the panel back such that the expandable game board 102 can traverse between two dimensions of 8×8 and/or 8×9. It will also be appreciated that the expandable game board 102 can be made of other suitable materials. It should be noted that the expandable version of the game board is more practical when a thicker board made of hard material, like plastic or wood is used.

The expandable game board 102 provided with the playing pieces (one of 104 or 106) is designed to be played by the players in manual and/or electronic mode. In one embodiment, the manual mode of the playing game, the players move and/or capture the playing pieces (one of the pieces of set 104 or 106) by sliding the playing piece to the new square or picking up the playing piece (one of the pieces of set 104 or 106) and putting down on the new square. In another embodiment, the expandable game board 102 may be formed with the set of files 108 and the set of ranks 110 on one side of the expandable game board 102. The playing pieces 104 and 106 include at least a sensing element and an electronic circuit adapted to communicably operate on the expandable game board 102. In an embodiment, the expandable game board 102 has an electronic circuit configured to record the games and provide a display to the output device, for example, the monitor.

Figure 2:
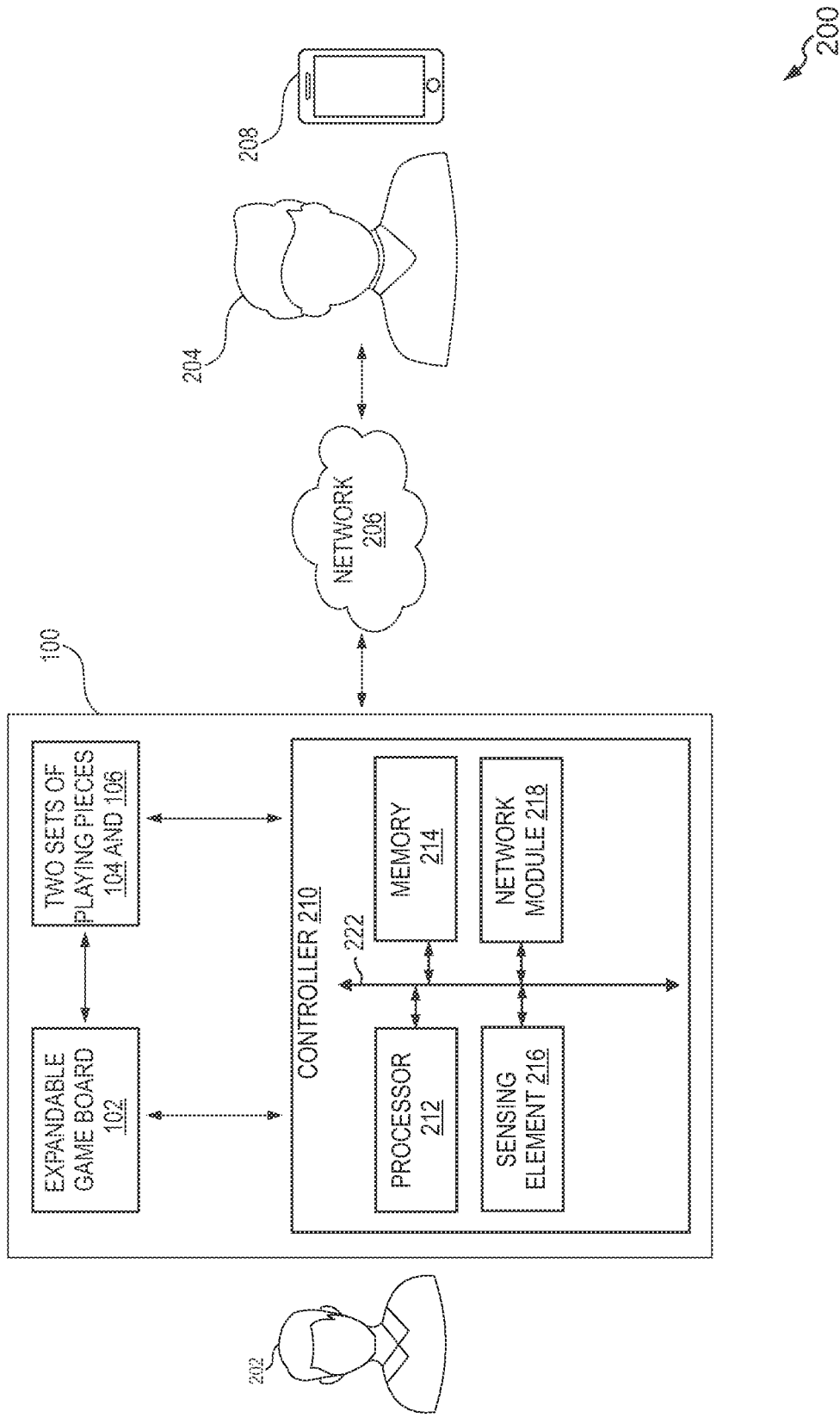
FIG. 2 illustrates a schematic diagram of a system used for remotely and/or physically playing the modified chess game using the apparatus of FIG. 1, in accordance with an embodiment of the present disclosure.

FIG. 2 illustrates a schematic diagram of a system 200 used for remotely and/or physically playing the modified chess game, in accordance with an embodiment of the present disclosure. The system 200 includes the apparatus 100 of FIG. 1 configured to be operated by the first and second players 202 and 204 for playing the modified chess game. The first and second players 202 and 204 may operate the apparatus 100 manually and/or electronically. In one example, as illustrated, the first player 202 may play the modified chess game manually, and the second player 204 may play the modified chess game, electronically. The second player 204 is associated with the apparatus 100, to provide input for operating the apparatus 100 via a network 206. The network 206 may be Local Area Network (LAN), a Wide Area Network (WAN), a Light Fidelity (Li-Fi) network, a Metropolitan Area Network (MAN), a fiber-optic network, a coaxial cable network, an internet, a satellite network, an Infrared (IR) network, a Radio Frequency (RF) network, a virtual network, or any combination thereof.

The electronic input provided by the second player 204 may include movement of the playing pieces (one of the sets 104 or 106), the capture of the playing pieces (one of the set 104 or 106), altering the conventional mode of the one or more playing pieces into a powered mode, or any other operation required for operating the apparatus 100. In a non-limiting example, the second player 204 may use an interactive application on his/her device for providing the input to the apparatus 100 to operate the playing pieces (one of the sets 104 or 106). The device may be any electronic device such as, but not limited to, a smartphone, a laptop, a tablet device, a Personal Computer (PC), a Personal Digital Assistance (PDA), and wearable devices. In the present configuration, the smartphone device 208 having an application for playing the modified chess game, is used to provide electronic input to the apparatus 100.

In one embodiment, a controller 210 is disposed within the expandable game board 102, the playing pieces of the set 104 and the set 106, or both. The controller 210 may include a processor 212, a memory 214, a sensing element 216, and network unit 218. In one embodiment, the processor 212 is configured to provide instruction to the expandable game board 102, the set 104, and the set 106 or both. The processor 212 may be a microprocessor, microcontroller, single-core processor, a multi-core processor, and/or a combination of one or more single-core processors and one or more multi-core processors.

The memory 214 may be one or more volatile memory devices, one or more non-volatile memory devices, and/or a combination configured to store machine-executable instructions. In an embodiment, the memory 214 stores logic and/or instructions, to be used by the processor 212 for controlling the movement of one or more playing pieces of the sets 104 and 106. In a non-limiting example, the memory 214 includes logic to regulate the movement of the playing pieces of the sets 104 and 106, based at least on at least one movement made by the second player 204 using the smartphone device 208. The apparatus 100 through the network 206 receives the movement of the pieces made by the player 204 in the smartphone device 208. The processor 212 processes the movement and sends an instruction to the controller 210. The controller 210 accordingly moves the set of playing pieces 104 or 106 to reflect the movement of the second player 204 in the smartphone device 208.

The sensing element 216 is disposed within a playing piece of the sets 104 or 106, the expandable game board 102, or both. The sensing element 216 can retrieve the movement, the current position, and the state of the playing piece, and communicate the same to the processor 212. The position of the playing pieces in the apparatus 100 is then updated in the smartphone device 208 of the second player 204 via the network 206. The update can include, but is not limited, to a front move, a back move, and a sideways move.

The network module 218 (also referred to as 'network unit') may include a communication circuitry like a transceiver circuitry that is provided with an antenna and other communication media interfaces to connect with other devices like smartphones, computers, etc., via network 206. According to the embodiment, the modified chess game can be electronically operated as an application programmed in mobile devices such as smartphones, tablets, laptops, and desktop computers. Alternatively, a mobile application is operatively connected to an electronically operated expandable game board 102 through the network 206, such that when the second player 204 makes a move, a signal is sent from the application to the expandable game board 102 and in response, one of the playing pieces of the sets 104 or 106 is moved to the specified position on the expandable game board 102. The various components of the controller 210 such as the processor 212, the memory 214, the network module 218, and sensing element 216 are configured to communicate with each other by means of a centralized circuit system 222.

In an embodiment, the at least one of the two sets of playing pieces 104, 106 is remotely operated to play the modified chess game using at least one smartphone device 208. The controller 210 of at least one of the two sets of playing pieces 104, 106 controls at least one physical movement of the playing piece mounted on the expandable game board 102, based on at least one remote movement of the playing piece performed on the smartphone device 208. In another embodiment, the sensing element 216 of at least one of the two sets of playing pieces 104, 106 senses the physical movement of the playing piece mounted on the expandable game board 102. The network module 218 of at least one of the two sets of playing pieces is configured to transmit the physical movement of the playing piece to the electronic device, wherein the position of the playing piece displayed on the electronic device is updated based on the sensed physical movement.

In one configuration, the expansion mechanism (best shown in FIGS. 3B-3C) of the expandable game board 102 adapted to alter one or more files and/or the ranks is accomplished through push-pull force. In a non-limiting example, one or more files are foldable with each other in such a manner that bottom surfaces join through sticking means like Velcro™. A pulling force (i.e. tensile force) is applied by the player on end portions of the expandable game board 102 to add an extra file. In contrast, the expandable game board 102 can be retracted by applying pushing force (i.e. compressive force) from the end portions of the expandable game board 102. Based on the expansion mechanism, one or more files can be added without changing the number of ranks. Otherwise, one or more ranks can be added other than the conventional ranks i.e. eight ranks without changing the number of files. Other than this, the conventional chess board having the set of eight files 108 and the set of eight ranks 110 can be modified to change both the at least one file and the at least one rank. In one example, the 8×8 board game is modified into a 9×9 board game. When one or more ranks are added to the expandable game board 102, then each set of playing pieces 104 or 106 other than the king 114 and the queen 112 needs to be increased in numbers accordingly, and the set of rules needs to be framed accordingly.

In one embodiment of the invention, when odds or handicapping is playing the game, a playing card (printable plastic or similar material) can be used to display on the table as a reminder to players during a game.

Figure 3A:
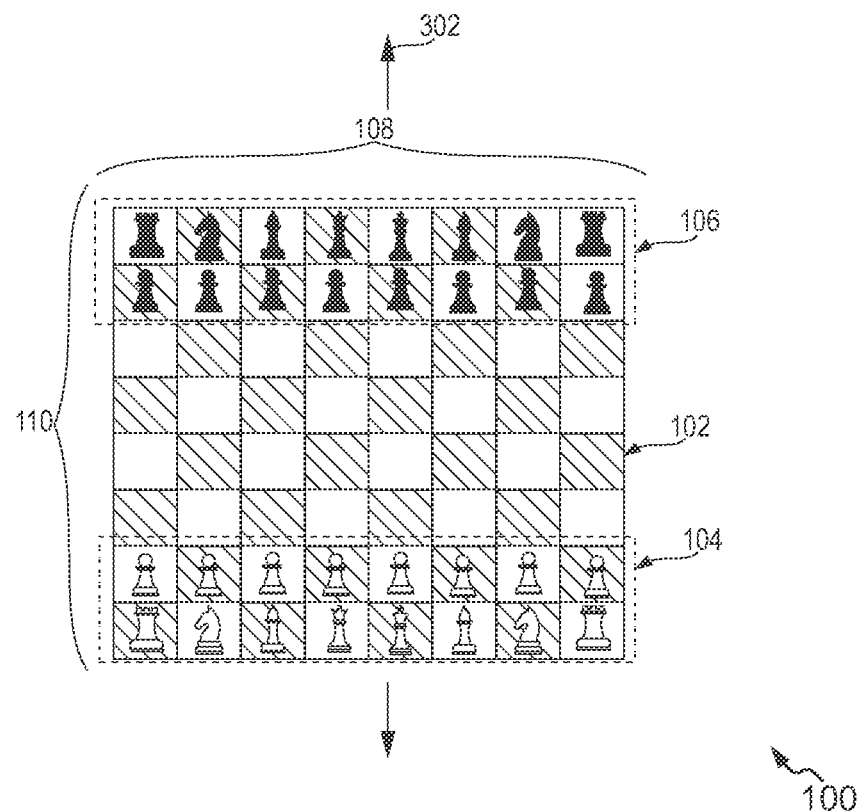
FIG. 3A illustrates a schematic diagram of the apparatus of FIG. 1 showing pulling force applied at ends of the expandable game board, to expand the board, in accordance with another embodiment of the present disclosure.

FIG. 3A illustrates a schematic diagram of the apparatus 100 of FIG. 1 showing pulling force 302 applied at the ends of the expandable game board 102, to expand the board, in accordance with another embodiment of the present disclosure. As shown, the pulling force 302 is applied at the ends of the expandable game board 102 to add a new row. It should be noted here that, the pulling force 302 is applied along the files to add one additional rank. Similarly, in case one additional column is to be added, pulling force 302 needs to be applied along the files 108. The expandable game board 102 includes an expansion mechanism (not shown in FIG. 3A) configured to alter at least one file of the set of files 108 and/or at least one rank of the set of ranks 110. The number of the files and the ranks to be altered is based on the players' demand. Altering the size of the expandable game board 102 introduces abrupt changes in the conduct of the modified game board based on agreed time or after several moves. However, it should be noted that the expandable game board 102 includes at least the set of eight files 108 and at least the set of eight ranks 110.

Figure 3B:
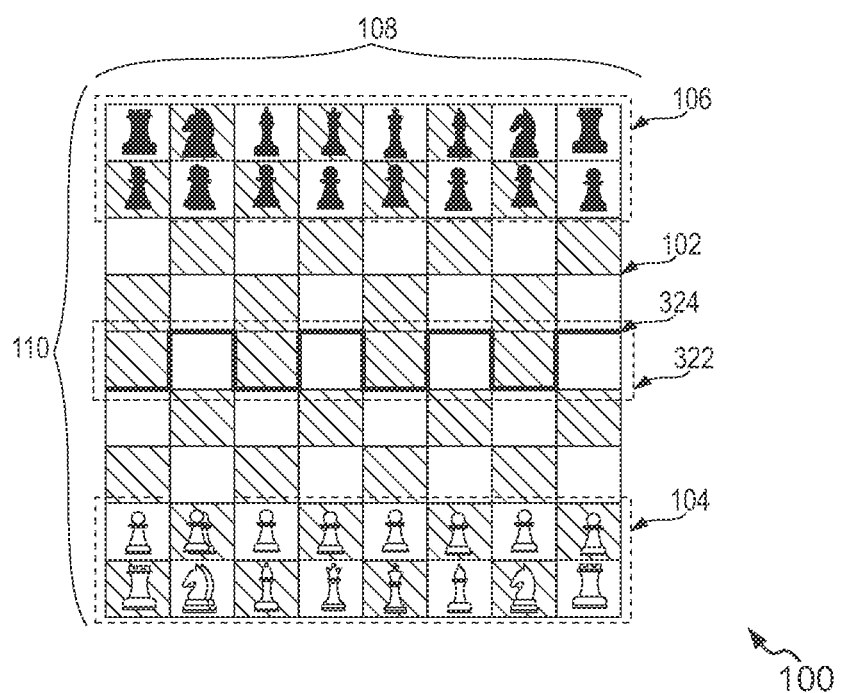
FIG. 3B illustrates a schematic diagram of the apparatus of FIG. 3A showing one row added in the expandable game board, in accordance with another embodiment of the present disclosure.

FIG. 3B illustrates a schematic diagram of the apparatus 100 of FIG. 3A showing one new rank 322 added in the expandable game board 102, in accordance with another embodiment of the present disclosure. The expandable game board 102 includes an expansion mechanism 324 configured to alter at least one file of the set of files 108 and/or at least one rank of the set of ranks 110. The number of the files and the ranks to be altered is based on the players' demand. Altering the size of the expandable game board 102 introduces abrupt changes in the conduct of the modified game board based on agreed time or after several moves. However, it should be noted that the expandable game board 102 includes at least the set of eight files 108 and at least the set of eight ranks 110.

When one or both the players and of the apparatus 100 apply the required pulling force 302 (i.e. tensile force) at the end portions of the expandable game board 102 (along the file direction), the new rank 322 can be added, preferably at the center of the expandable game board 102. More than one row can be added, by further pulling the end portions of the expandable game board 102, depending on the required number of additional new rows/ranks. The number of additional new ranks that can be expanded in the expandable game board 102 is set at the time of designing the apparatus 100. It should be noted that the pulling force 302 is applied with respect to rank, at the respecting ends of the expandable game board 102, such that the new rank is added.

Figure 3C:
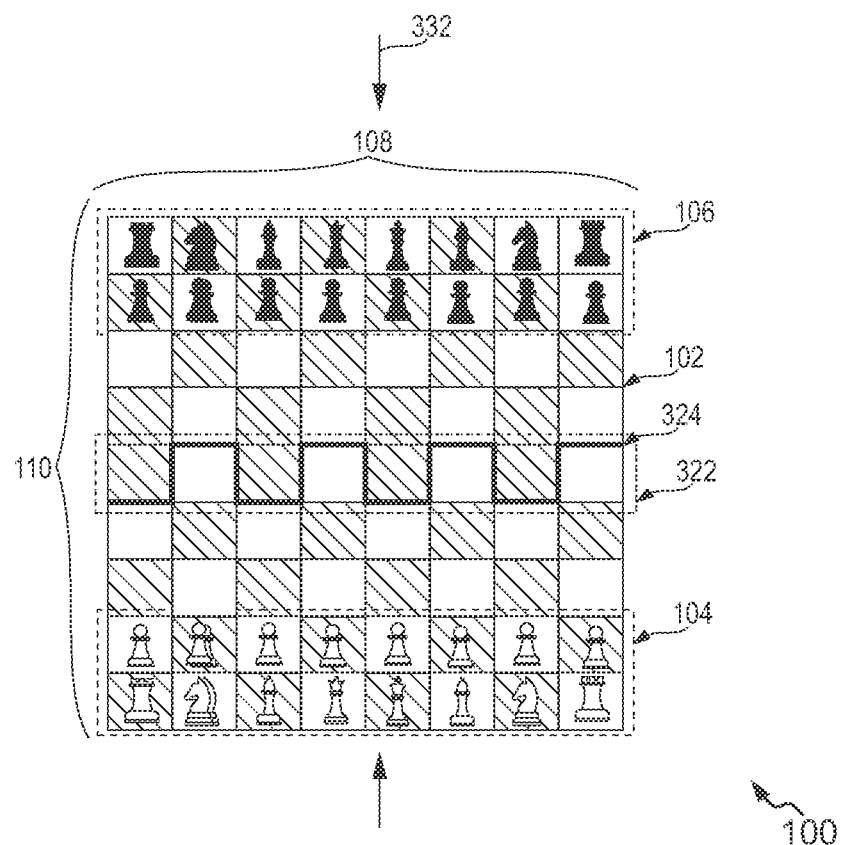
FIG. 3C illustrates a schematic diagram of the apparatus of FIG. 3B showing pushing force applied at ends of the expandable game board, to retract the board, in accordance with another embodiment of the present disclosure.
Figure 3D:
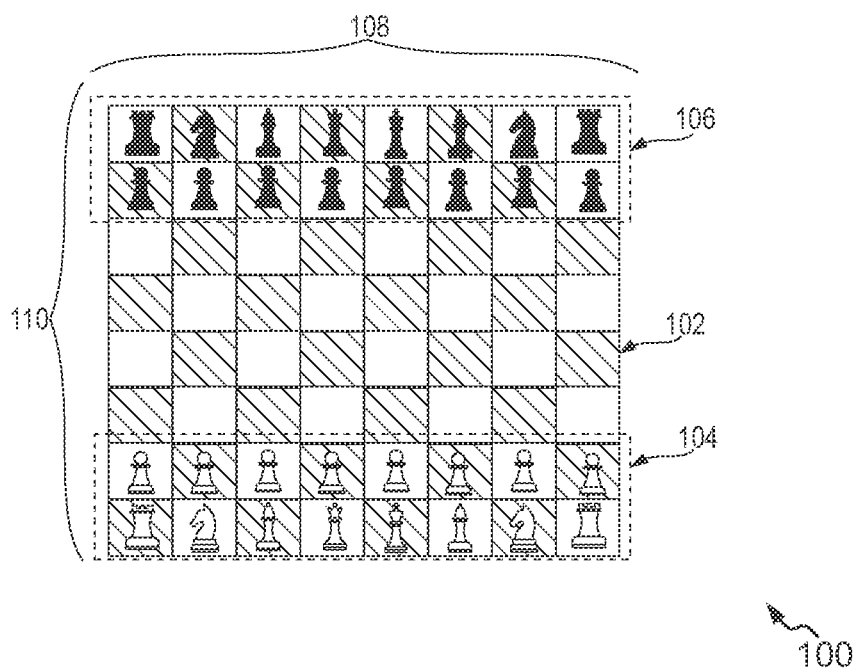
FIG. 3D illustrates a schematic diagram of the apparatus of FIG. 3C showing the standard expandable game board after retracting the additional rank (row), in accordance with another embodiment of the present disclosure.

FIG. 3C illustrates a schematic diagram of the apparatus 100 of FIG. 3B showing pushing force 332 applied at the ends of the expandable game board 102, to retract the board, in accordance with another embodiment of the present disclosure. As shown, the expandable game board 102 can be retracted by applying pushing force 332 (i.e. compressive force) from the ends of the expandable game board 102. The motion retracts the new rank 322 in the expandable game board 102, preferably the rank that is added in the center. More than one rank can be retracted by further pushing the end portions of the expandable game board 102, depending on the required number of added new rows FIG. 3D illustrates a schematic diagram of the apparatus of FIG. 3C showing standard expandable game board 102 after retracting the additional rank (row), in accordance with another embodiment of the present disclosure. As shown, the new rank 322 is retracted, and the expandable game board 102 forms size of the conventional chess board having size of eight rows and eight columns.

When one or both the players and of the apparatus 100 apply the required pulling force 302 (i.e. tensile force) at the end portions of the expandable game board 102 (along the file direction), a new rank 322 can be added, preferably at the center of the expandable game board 102. More than one row can be added, by further pulling the end portions of the expandable game board 102, depending on the required number of additional new rows/ranks. The number of additional new ranks that can be expanded in the expandable game board 102 is set at the time of designing the apparatus 100. It should be noted that the pulling force 302 is applied with respect to file, at the respecting ends of the expandable game board 102, such that the new rank is added. In contrast, the expandable game board 102 can be retracted by applying pushing force (i.e. compressive force) from the ends of the expandable game board 102. The motion retracts one rank in the expandable game board 102, preferably the rank that is added in the center. More than one rank can be retracted by further pushing the end portions of the expandable game board 102, depending on the required number of added new rows.

When the player or user of the apparatus 100 applies the required pulling force (i.e. tensile force) at the end portions of the expandable game board 102 (along the rank direction), a new file can be added, preferably at the center of the expandable game board 102. More than one column/file can be added, by further pulling the end portions of the expandable game board 102, depending on the required number of additional new columns/files. The number of additional new columns/files that can be expanded in the expandable game board 102 are set at the time of designing of the apparatus 100. It should be noted that the pulling force 302 is applied with respect to the rank, at the respecting ends of the expandable game board 102, such that a new file is added. In contrast, the expandable game board 102 can be retracted by applying pushing force (i.e. compressive force) 332 from the ends of the board. The motion retracts one file in the expandable game board 102, preferably the file that is added in the center. More than one file can be retracted by further pushing the end portions of the expandable game board 102, depending on the required number of added new files.

In one configuration, the expandable game board 102 is made of vinyl, leather, or silicon roll-up mat. In such a configuration, one side of the board is configured as an expandable chess board and the other side as a power zone configured standard chess board. The power zone is printed in an 8×8 board configuration to allow conventional chess to be played without power pieces. Additional file or rank can be achieved by printing with 8×9 squares on the flip side of the roll-up board. In an embodiment of the expandable board, the additional file or rank exposed by a mechanism need not be checkered to avoid orthogonally adjacent color squares similar in color in certain regions. Instead, the squares are made empty or non-filled but are bounded by a heavy line outlining the square shape. Outlining the square on the board provide clarity in the visual continuity of diagonals, files, and ranks.

Figure 4:
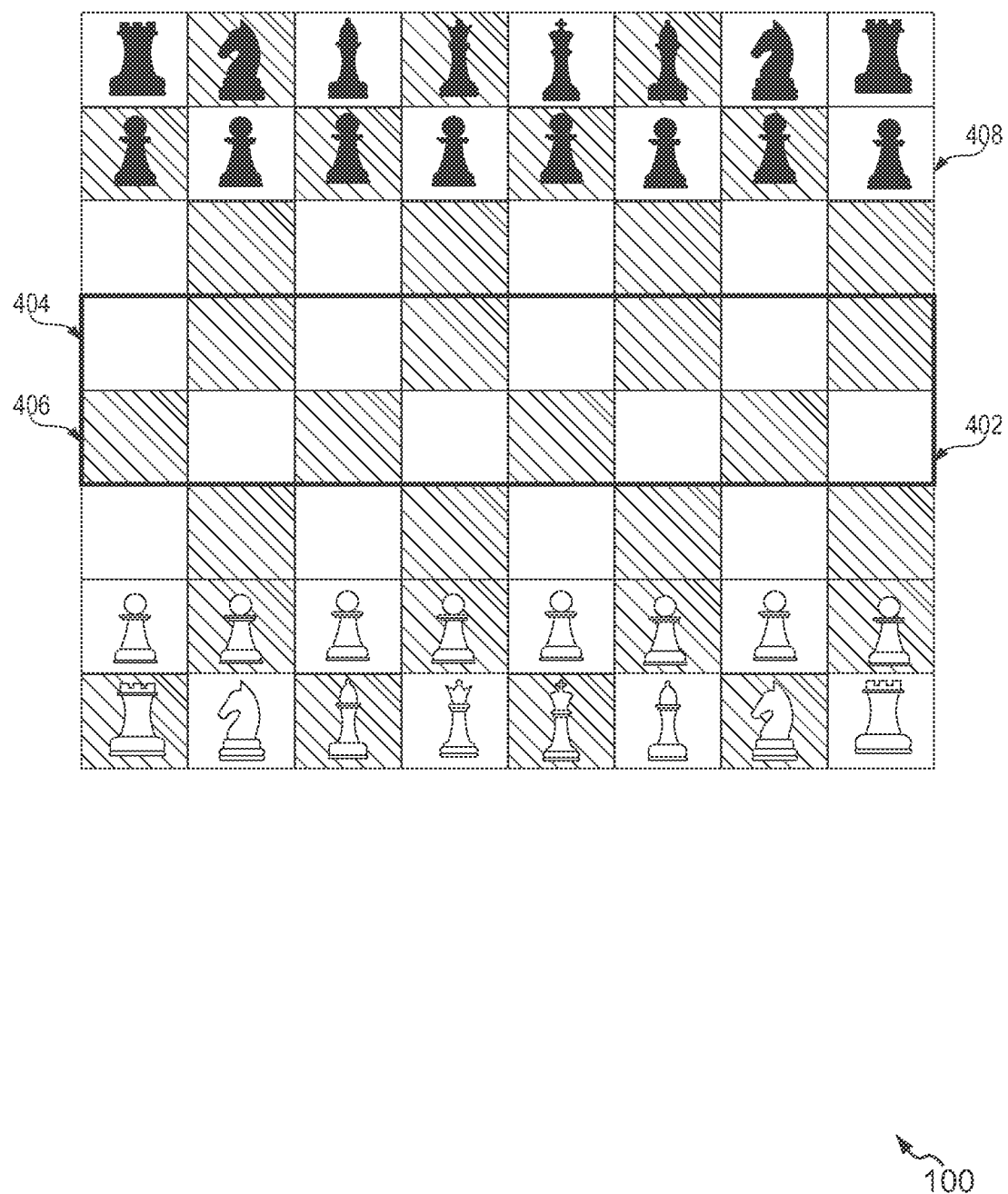
FIG. 4 illustrates a schematic diagram of the apparatus for playing the modified chess game with a power zone, in accordance with another embodiment of the present disclosure.

FIG. 4 illustrates a schematic diagram of the apparatus 100 of FIG. 1 with a power zone 402, in accordance with an embodiment of the present disclosure. As shown, the power zone 402 is a part of the expandable game board 102 constructed as a rectangular strip that covers two middle ranks 404 and 406 distinguished from the rest of the rows of the expandable game board 102. A zone other than the power zone 402 is a conventional zone 408. The power zone 402 is provided for altering the playing rules of one or more playing pieces of sets 104 and 106. In other words, the power zone 402 is provided on a portion of the expandable game board 102 to regulate the movement of the powered playing pieces in the powered mode. The power zone 402 may be in different patterns or designs or colors or prints distinguishing it from the rest of the squares of the expandable game board 102.

The power zone 402 distinguished from the rest of the squares of the expandable game board 102 is one or more files, one or more ranks 110, or any combination thereof. In the present embodiment, the expandable game board 102 includes two middle ranks 404 and 406 as the power zone 402 to regulate piece-capture capability. According to another embodiment, the power zone 402 may be arranged vertically along the one or more files 110. However, it will be appreciated by those having ordinary skills in the art that the power zone 402 may be arranged in multiple ways to add variety to the chess game. In an exemplary scenario, multiple power zones may be scattered symmetrically in groupings all over the expandable board game 102.

According to the preferred embodiment, the expandable game board 102 of the present disclosure is operable to expand between at least two dimensions of a play area and includes at least one power zone 402 where one or more powered chess pieces can alternate between two states of power during the game wherein the second mode of the game is called the powered mode and the power zone 402 regulates the movement of playing pieces in the powered mode.

The one or more playing pieces of the two sets 104 and 106 operating in the power zone 402 use powered rules than conventional rules. At least two bishops 116, the at least two knights 118, the at least two rooks 120, and the at least eight pawns 122 of at least one set of the two sets 104 and 106 of playing pieces are provided with a switching member adapted to form corresponding powered playing pieces during the modified chess game. The powered playing pieces are operated based on a set of powered rules.

The powered rules provide the powered bishop, the powered knight, the powered pawn, and the powered of the rook. The playing pieces other than the king and the queen capture only while entering or leaving the power zone 402. The powered bishop and the powered knight are allowed to move, but not allowed to capture outside the power zone 402. In the power mode, the playing pieces other than the powered playing pieces operate in the conventional mode. Two states of mode are namely, the conventional mode and the modified mode. Hereinafter, the modified mode is also referred to as 'powered mode'

According to a preferred embodiment, the modified chess game introduces powered playing pieces that include a powered bishop, a powered knight, a powered rook, and a powered pawn adapted to operate in the powered mode.

The powered pieces are enabled with a switching member to identify and operate the playing pieces in the powered mode during the game. Turning on a toggle switch of the switching member indicates that the playing piece is operating in the powered mode and the rules of the powered chess apply. In contrast, when the toggle switch is turned off, the pieces operate as conventional chess pieces and the rules of conventional chess apply in this mode. The geometrical configuration of the playing pieces adapted with the switching member is explained further in detail with respect to FIG. 10.

Traditionally, the conventional chess game weakens a lesser skilled player, while powered chess empowers the weaker player by playing full or limited powered chess, but the stronger player may choose to play in the conventional mode. In one embodiment, players may agree before the game about what kind of varying levels of powered and standard chess combination to use in the game. Exemplary scenarios of the levels include but are not limited to:

a. Level 1: Weak player plays full powered chess, and the stronger player plays conventional chess only.
b. Level 2: Weak player plays full powered chess, and the stronger player plays a combination of partial powered chess and the conventional chess.
c. Level 3: Weak player plays full powered chess, and the stronger player plays weaker powered chess (i.e. with moving ability and without capture capability).
d. Level 4: Weak player plays powered chess with extended capture capability beyond the power zone, and the strong player plays complete powered chess.
e. Level 5: Equal strength players (i.e. both players play complete powered chess), but may elect to play with a different board orientation of the power zone.

The conventional knight and bishop, when activated using the toggle switch of the switching member (best shown in FIGS. 10, and 11) before the start of the chess game, gain the power to move like a rook (in power zone) limited to a range of two squares going front and back or sideways.

The powered knight can also leap over a piece standing on the first square that obstructs its path to the second square orthogonally but without the capability to capture. Like a traditional pawn, the powered knight is a divergent piece with different movements for capturing and moving.

Further, the knight also gains a limited rook move, like the bishop where the knight can also leap over to reach the second square orthogonally. However, the knight can only capture the enemy pieces on the first square. It may slide or jump to the second square orthogonally only to move but not capture.

The pawns already possess the rook move when moving forward, but can capture diagonally like the bishop. Additionally, when inside the power zone 402 of the game board, the pawns can capture or move sideways on a vacant square while retaining their capability to capture diagonally. However, if a pawn is blocked in front by an enemy pawn, the lateral movement and capture are also blocked. Variations of these thematic moves are possible per the agreement of players.

The king which has the combined power of the bishop and the rook 120 does not have any new capabilities in the powered mode. However, the king is immune from capture by the extra power of the knights and the bishops. Hence, the powered rook using its traditional movement of a conventional rook can capture the king. On the other hand, the king may threaten or capture all enemy chess pieces in her path as in conventional chess. Further, in powered rule, the powered king when protected by a friendly piece or pawn, can checkmate the conventional king alone or even another unprotected power king. Here "protected" means a friendly piece that can capture conventionally on the square where the friendly power king is mounted. This will reduce the likelihood of draw by insufficient force.

The queen 112 retains his conventional movement and cannot be threatened or checkmated by powered powers of the other pieces in the powered mode.

In the powered mode, the one or more playing pieces of one or two sets 104 and 106, in addition to their conventional move, acquire new power moves. Bishops move two squares orthogonally to retain their color/pattern designation when moving conventionally. They may also leap over to move or capture the second square. A bishop cannot stay or capture on the first orthogonal square of the opposite color. Knights traditionally capture on a square opposite in color from where they stand. Therefore, they move and capture on the first orthogonal square but move only or leap to the second square without capture capability.

Pawns can move or capture an opponent's pawn one square sideways but cannot move or capture the other playing pieces. Thus, promotion is allowed but not the "En passant" move of conventional chess. In the powered rule, the powered pawn can move and capture diagonally while inside the power zone, that is, from the power zone square to another square diagonally in the power zone.

Capture capability of chess pieces except for the queen and the king is allowed only while going to or coming from the power zone 402. Outside the zone area, knights and bishops can move but not capture while using the powered rook (wherein the powered rook is the piece operating in the powered state of the game). The power zone 402 does not affect the conventional moves of chess pieces in powered mode.

Powered rook combines rook, bishop, and knight moves but may not capture using its rook movement except when capturing the king. Conventional knight or bishop moves cannot capture a powered rook. Here, a powered rook refers to the rook with the toggle switch activated. A powered rook may be captured by the opponent powered, king, and queen.

The rook can capture a powered rook but a powered rook cannot capture a rook using the conventional rook move.

Figure 5:
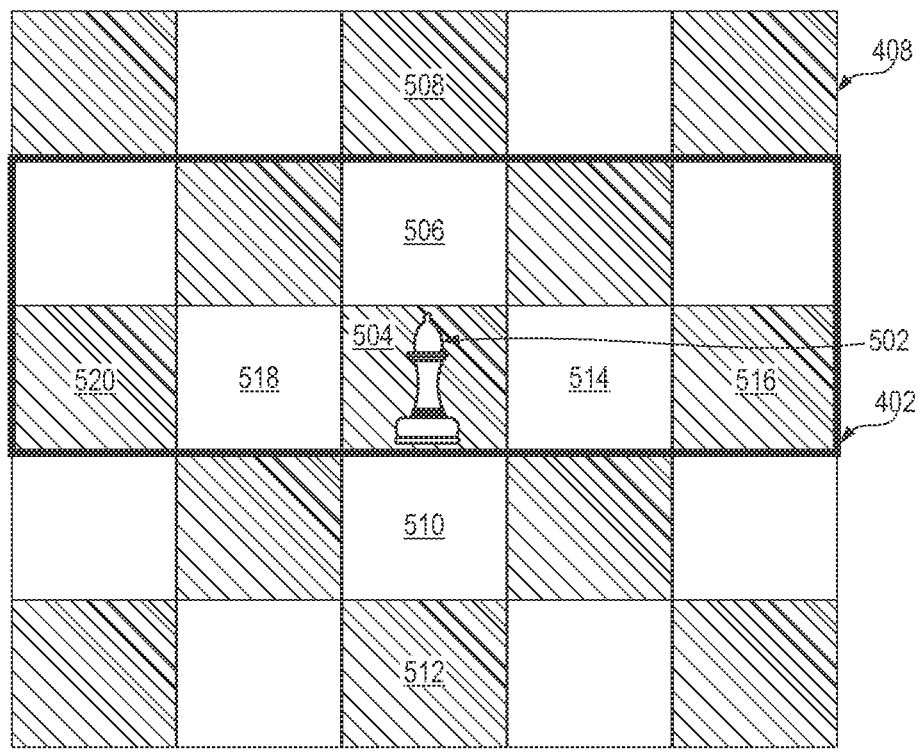
FIG. 5 illustrates a schematic diagram of a part of the power zone of the apparatus of FIG. 4 with a powered bishop, in accordance with an embodiment of the present disclosure.

FIG. 5 illustrates is a schematic diagram of the power zone 402 of the apparatus 100 of FIG. 4 with a powered bishop 502, in accordance with an embodiment of the present disclosure. As shown, the powered bishop 502 is mounted on a square 504 of the power zone 402 of the expandable game board 102. When the powered bishop 502 enters the power zone 402, the powered rules apply. The powered rule facilitates the powered bishop 502 to move in an orthogonal direction by retaining the diagonal move used in the conventional mode. In other words, the powered bishop 502 gets extra power in the power zone 402 to move and/or capture the opponent's pieces, without losing the conventional power of moving and/or capturing the opponent's pieces.

The powered rule allows the powered bishop 502 to move and/or capture a second adjacent orthogonal square of same the color/pattern located with respect to the current square 504 of the powered bishop 502. In the present configuration, the powered rule allows the powered bishop 502 to move and/or capture the opponent's piece positioned in one of a front square 508, a back square 512, a right square 516, and a left square 520. It should be noted that the powered bishop 502 moves to the second adjacent orthogonal square for retaining its color/pattern designation while moving conventionally. The powered bishop 502 may also leap over to move or capture the second adjacent orthogonal square.

However, the powered rule does not allow the powered bishop 502 to move and/or capture the opponent's one of the playing pieces positioned in a first adjacent orthogonal square of the same color/pattern located with respect to the original color/pattern of the square 504 of the expandable game board 102 over which the powered bishop 502 is mounted. In the present configuration, the powered rule does not allow the powered bishop 502 to move and/or capture the opponent's pieces positioned at one of the first adjacent front square 506, a back square 510, a right square 514, and a left square 518.

Moreover, the moving and/or capturing capability of the powered bishop 502 beyond the power zone 402 depends upon the proficiency levels for playing the modified chess game. At a non-limiting level, the weak player plays the modified chess game with extended capture capability beyond the power zone 402, and the strong player plays the modified chess game. Thus, one or more powered bishops 502 of the weak player can capture the strong player's pieces both in the power zone 402 and in the conventional zone 408. However, the strong player can capture the weak player's pieces only in the power zone 402, and not in the conventional zone 408 of the expandable game board 102. It should be noted that the capture capability is allowed only while going to or coming from the power zone 402. Therefore, the conventional pieces outside the power zone 402 can be captured by the powered bishop 502 positioned in the power zone 402.

Further, in the power zone 402, the conventional bishop can move and/or capture the opponent's pieces mounted only on the diagonal squares with respect to the original position of the bishop. However, the conventional bishop cannot move orthogonally in the power zone 402. In other words, the conventional bishop cannot move in the front squares 506 and 508, the back squares 510 and 512, the right squares 514 and 516, and the left squares 518 and 520. In one example, the conventional bishop originally mounted on the white square can move diagonally on white squares only.

Figure 6:
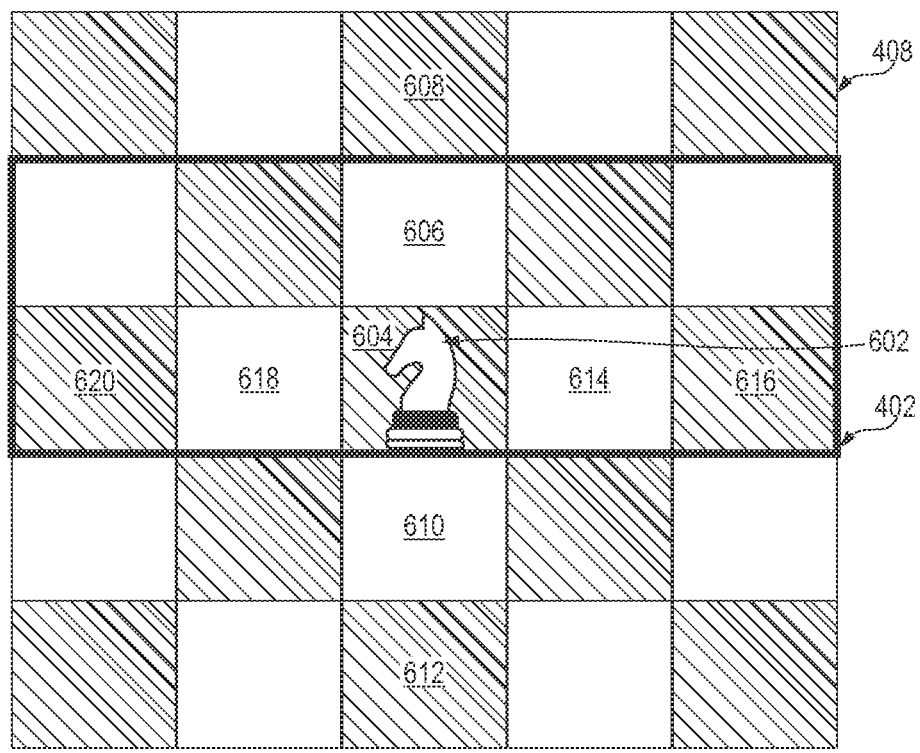
FIG. 6 illustrates a schematic diagram of a part of the power zone of the apparatus of FIG. 4 with a powered knight, in accordance with an embodiment of the present disclosure.

FIG. 6 illustrates a schematic diagram of the power zone 402 of the apparatus of FIG. 4 with a powered knight 602, in accordance with an embodiment of the present disclosure. As shown, the powered knight 602 is mounted on a square 604 of the power zone 402 of the expandable game board 102. When the powered knight 602 enters the power zone 402, the powered rules apply. The powered rule facilitates the powered knight 602 to move in an orthogonal direction, and retain 'L-shape' move used in the conventional mode. The L-shape move of the knight 118 includes either moving front or back by one square (i.e. along the file) and over two squares horizontally (i.e. along the rank), otherwise front or back by two squares vertically (i.e. along the file) and over one square horizontally (i.e. along the rank). In other words, the powered knight 602 gets extra power in the power zone 402 to move and/or capture the opponent's pieces, without losing the conventional power of moving and/or capturing the opponent's pieces.

The powered rule allows the powered knight 602 to move and/or capture one of a first adjacent orthogonal squares of the opposite pattern located with respect to the current square 604 of the powered knight 602. In the present configuration, the powered rule allows the powered knight 602 to move and/or capture the opponent's piece positioned in one of a front square 606, a back square 610, a right square 614, and a left square 618. It should be noted that the powered knight 602 moves to one of the first adjacent orthogonal squares for altering its pattern designation while moving conventionally.

Furthermore, the powered rule allows powered knight 602 to move in a second adjacent orthogonal squares located with respect to the current position of the square 604 of the expandable game board 102 over which the powered knight 602 is mounted. However, the powered rule does not allow powered knight 602 to capture the opponent's piece positioned in the second adjacent orthogonal squares located with respect to the original position of the square 604 of the expandable game board 102 over which the powered knight 602 is mounted.

Moreover, the moving and/or capturing capability of the powered knight 602 beyond the power zone 402 (i.e. in the conventional zone) depends upon the proficiency levels for playing a modified chess game. At a non-limiting level, the weak player plays the modified chess game with extended capture capability beyond the power zone 402, and the strong player plays the complete modified chess game. Thus, powered knight 602 of the weak player can capture the strong player's pieces in both the conventional zone 408 and the power zone 402. However, the strong player can capture the weak player's pieces only in the power zone 402, and not in the conventional zone 408 of the expandable game board 102. It should be noted that the capture capability is allowed only while going to or coming from the power zone 402. Therefore, the conventional pieces outside the power zone 402 can be captured by the powered knight 602 positioned in the power zone 402.

Further, in the power zone 402, the conventional knight 118 can move and/or capture the opponent's pieces mounted only on the L-shape of the square with respect to the original position of the conventional knight 118. However, the conventional knight 118 cannot move orthogonally in the power zone 402. In other words, the conventional knight 118 cannot move in any of the front squares 606 and 608, back squares 610 and 612, right side squares 614 and 616, and left side squares 618 and 620. In one example, the conventional knight 118 originally mounted on the white square can move in the L-shape of the square on patterned squares only.

Figure 7:
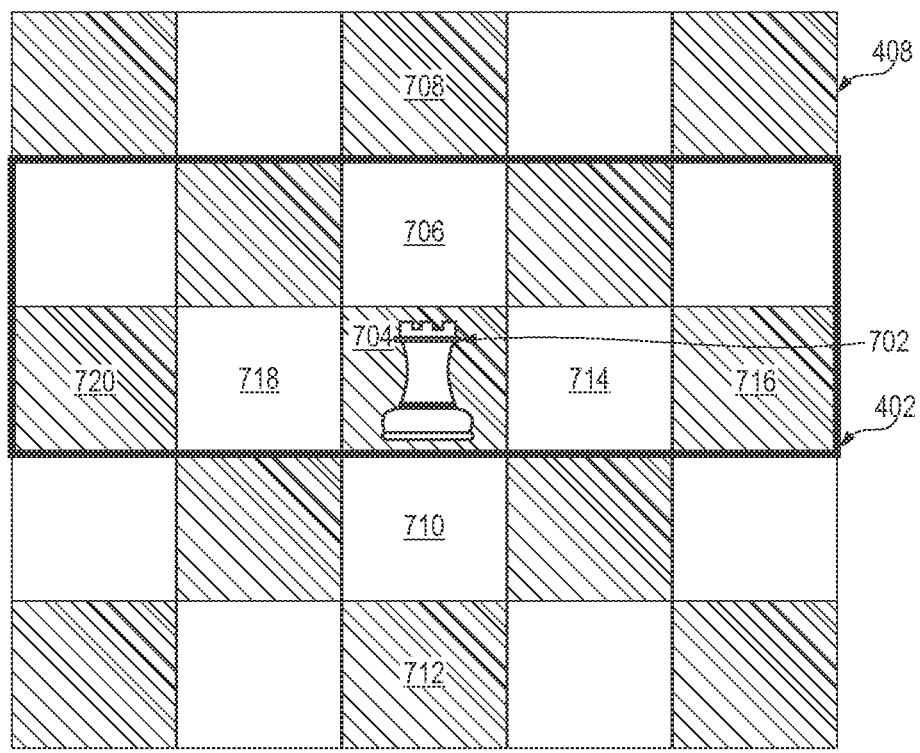
FIG. 7 illustrates a schematic diagram of a part of the power zone of the apparatus of FIG. 4 with a powered rook, in accordance with another embodiment of the present disclosure.

FIG. 7 illustrates a schematic diagram of the power zone 402 of the apparatus of FIG. 4 with a powered rook 702, in accordance with an embodiment of the present disclosure. As shown, the powered rook 702 is mounted on a square 704 of the power zone 402 of the expandable game board 102. When the powered rook 702 enters the power zone 402, the powered rules apply. The powered rook 702 mounted on a square 704 loses power to capture when moving like the conventional rook, but gains the movements of the conventional bishop and the conventional knight. The conventional rook can move in each of the adjacent orthogonal squares 706-720. It is immune, however, from capture by traditional moves of the bishop and the knight. Thus, the conventional rook and the powered rook 702 move in different fashions according to the rules of the modified chess game.

Figure 8:
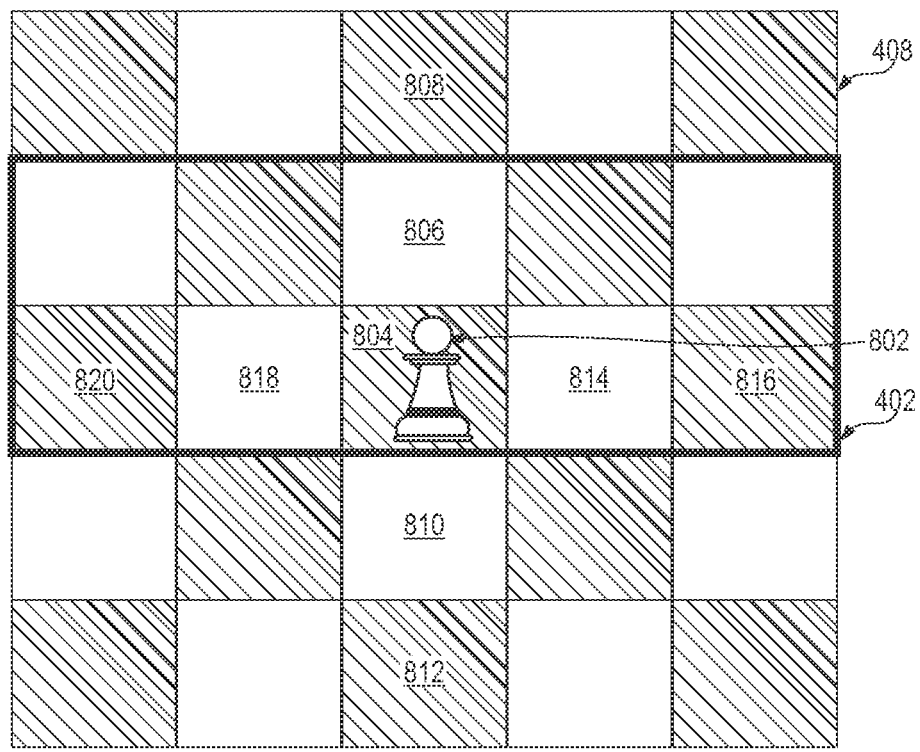
FIG. 8 illustrates a schematic diagram of a part of the power zone of the apparatus of FIG. 4 with a powered pawn, in accordance with another embodiment of the present disclosure.

FIG. 8 illustrates a schematic diagram of the power zone 402 of the apparatus of FIG. 4 with a powered pawn 802, in accordance with an embodiment of the present disclosure. As shown, the powered pawn 802 is mounted on a square 804 of the power zone 402 of the expandable board game 102. When the powered pawn 802 enters the power zone 402, the powered rules apply. The powered rule facilitates the powered pawn 802 to move in the sideway direction, and retain the front move in the first square 814 that is used in the conventional zone 408. In other words, the powered pawn 802 gets the extra power in the power zone 402 to move and/or capture the opponent's pieces, without losing the conventional power of moving and/or capturing the opponent's pieces. The powered rule allows the powered pawn 802 to move and/or capture first adjacent sideway squares having opposite colors/patterns located with respect to the original square 804 of the powered pawn 802. In the present configuration, the powered rule allows the powered pawn 802 to move and/or capture the opponent's piece positioned in one of the right square 806, and the left square 810. The back move in square 818 is not allowed in both the power zone 402 and the conventional zone 408.

However, the powered rule does not allow the powered pawn 802 to move in a second adjacent orthogonal squares 808, 812, 816, or 820 is having the same color/pattern located with respect to the original positional color of the square 804 of the expandable game board 102 over which the powered pawn 802 is mounted. The powered rule also not allows the powered pawn 802 to capture the playing pieces other than the pawn piece of the opponent player.

The powered pawn 802 already possesses the rook moves when moving forward, but can capture diagonally like the bishop 116 and additionally, when inside the power zone 402 of the game board, pawns can capture or move sideways on a vacant square while retaining their capability to capture diagonally. However, if a powered pawn 802 is blocked in front by an enemy pawn, the lateral movement and capture are also blocked. Variations of these thematic moves are possible per the agreement of players.

Moreover, the moving and/or capturing capability of the powered pawn 802 beyond the power zone 402 (i.e. in the conventional zone 408) depends upon the proficiency levels for playing a modified chess game. At a non-limiting level, the weak player plays the modified chess game with extended capture capability beyond the power zone 402, and the strong player plays the complete modified chess game. Thus, one or more powered pawns 802 of the weak player can capture the strong player's pieces in both the conventional zone 408 and the power zone 402. However, the strong player can capture the weak player's pieces only in the power zone 402, and not in the conventional zone 408 of the expandable board game 102.

In the modified chess game, a geometrical configuration of the one or more conventional bishop 116, the knight 118, the rook, and the pawn are altered into the corresponding powered playing pieces viz. the powered bishop 502, the powered knight 602, the powered rook 702, and the powered pawn 802 through a toggle switch of the switching member. It should be noted that the toggle switch of the switching member may be enabled before the start of the modified chess game or during the playing of the modified chess game, depending upon the proficiency level chosen by the players 202 and 204.

Figure 9A:
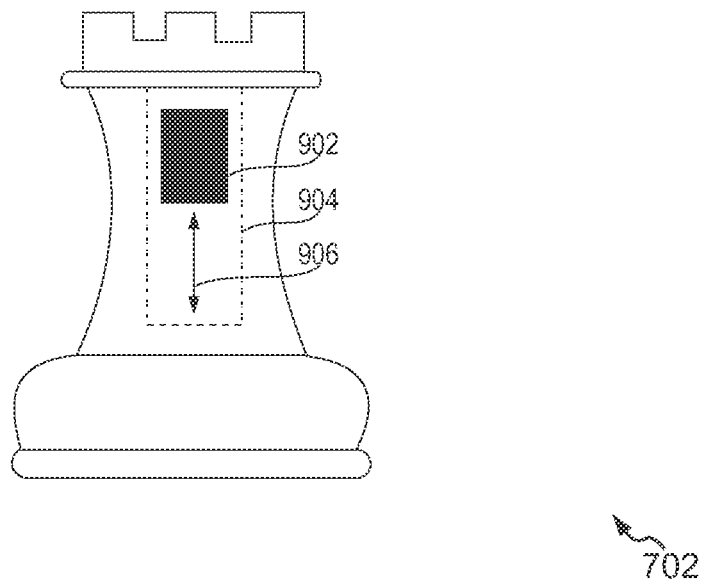
FIG. 9A illustrates a front view of a powered rook with a shift weight, in a normal standing position, in accordance with another embodiment of the present disclosure.
Figure 9B:
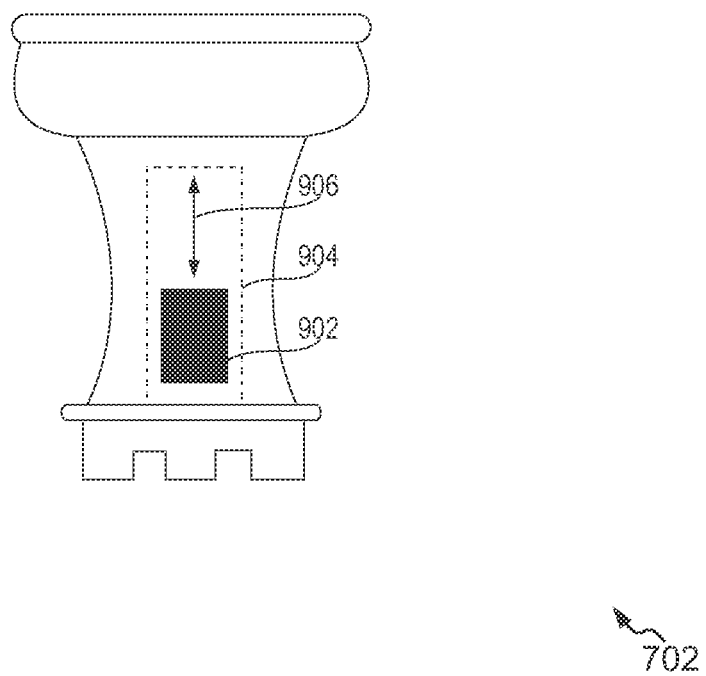
FIG. 9B illustrates a front view of the powered rook of FIG. 9A, in an upside-down position, in accordance with another embodiment of the present disclosure.

FIG. 9A illustrates a front view of the powered rook 702 with a shift weight 902, in a normal standing position, in accordance with another embodiment of the present disclosure. FIG. 9B illustrates a front view of the powered rook 702 of FIG. 9A, in upside down position, in accordance with another embodiment of the present disclosure.

According to an illustrated embodiment, the powered rook 702 is constructed in a manner to form a cavity 904 within a body of the powered rook 702. The cavity 904 is formed to accommodate the shift weight 902. The shift weight 902 accommodate within the powered rook 702 is adapted to toggle between the conventional mode and the powered mode. A clearance fit may be provided in between the shift weight 902 and the cavity 904 of the powered rook 702 for the ease of sliding. Further, an outer surface of the shift weight 902 may be formed with a layer of material (i.e. coating) that provides sliding movement within the cavity 904 with the least friction and without jamming or sticking the surfaces. In one configuration, the shift weight 902 which slides within the cavity 904 is arranged concentrically. Thus, a geometrical profile of the cavity 904 should be identical to the geometrical profile of the shift weight 902. In one embodiment, a toggle switch of the switching member (shown in FIGS. 10A and 10B) is used to switch the playing piece from the conventional mode to the powered mode, or vice versa. The toggle switch can be activated to expose an indicator (shown in FIGS. 10A and 10B) in the powered mode and can be deactivated to hide the indicator in the conventional mode. The upward and downward movement 906 of the shift weight 902 within the cavity 904 are shown in FIGS. 9A and 9B.

The shift weight 902 is made up of suitable material like mild steel having superior ductility and toughness, and arranged in a manner to prevent cracking of the powered rook 702 while toggling between the conventional mode and the powered mode, and ensures proper weight distribution and balance of the powered rook 702. Further, the powered rook 702 may include a switching member containing a toggle switch with a retractable mechanism that indicates the completion of a move in the specified modes i.e. the conventional mode and the powered mode. The toggle switch switches with or without a light-emitting diode (LED) on top of powered rook 702 is capable of momentary retention or locking position actuated by the retractable mechanism.

Figure 10A:
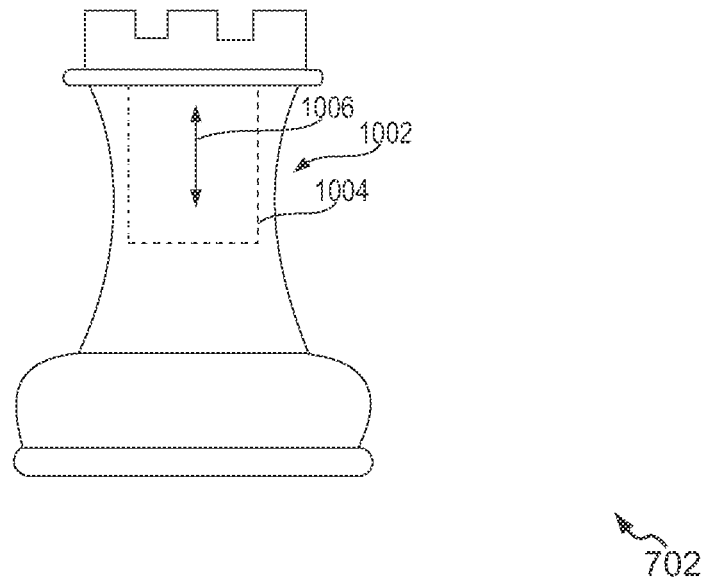
FIG. 10A illustrates a front view of the rook piece in a conventional mode, without operating a switching member, according to another embodiment.
Figure 10B:
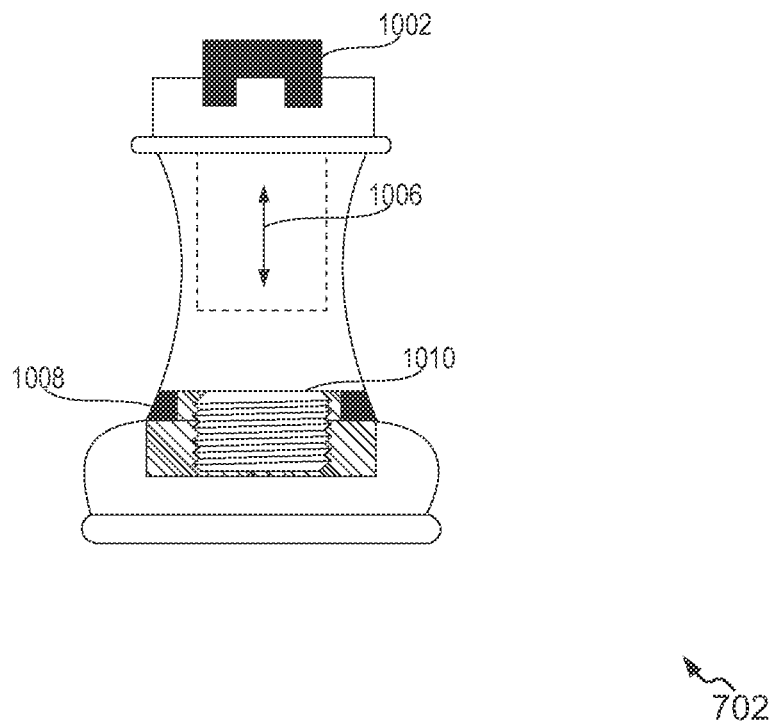
FIG. 10B illustrates a front view of the rook piece in a power mode, by operating the switching member to show a color band, according to another embodiment.

FIG. 10A illustrates a front view of the powered rook 702 in the conventional mode, without operating a switching member 1002, according to another embodiment. FIG. 10B illustrates a front view of the powered rook 702 in the powered mode, by operating the switching member 1002, according to another embodiment. In one configuration, the switching member 1002 includes a toggle switch 1004 and an indicator 1008. In the illustrated embodiment, the powered rook 702 can be locked in its configuration during the modified chess game through the mechanism of the toggle switch 1004 which moves in an upward/downward direction 1006. Upon pushing the toggle switch 1004 down, the retractable mechanism is activated. In one embodiment, pushing the toggle switch 1004 creates a threaded extension by releasing a thread 1010. Releasing the thread 1010 reveals the indicator 1008 (e.g., color band) that hides within the body of the powered rook 702. In the locked-down positions, the powered rook 702 operates with the same power as the conventional mode, and in the elevated position, the powered rook 702 operates in the powered mode. In another configuration, the retractable mechanism may be adapted with a magnetic attachment that retracts/expands the rook piece 702. When the powered rook 702 expands, the hidden indicator 1008 (e.g., color band) gets exposed, indicating the rook piece 702 is operating in the powered mode. It should be noted that, the conventional rook piece with the indicator 1008 is referred as the powered rook piece. The powered rook piece gets power of the rook along with the power of the conventional rook piece in powered mode.

Figure 11A:
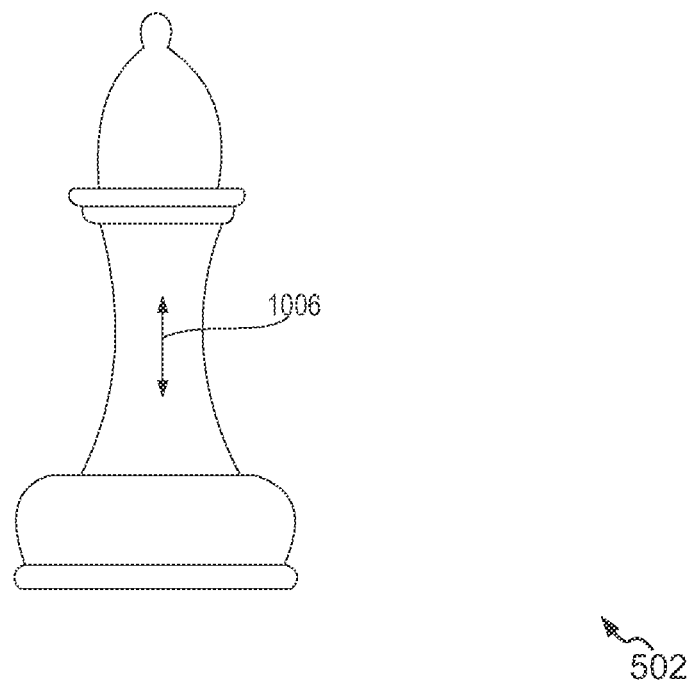
FIG. 11A illustrates a front view of the bishop piece in a conventional mode, without a color band, according to another embodiment.
Figure 11B:
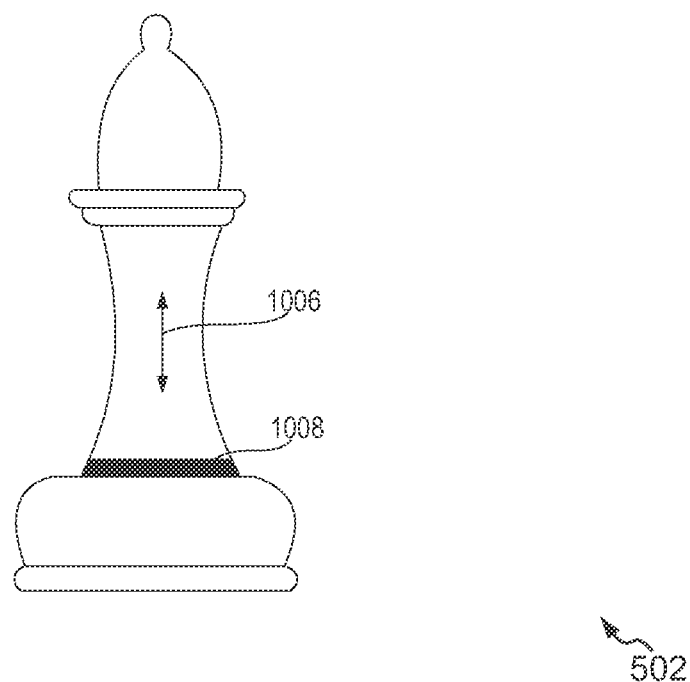
FIG. 11B illustrates a front view of the bishop piece in a power mode, with the color band, according to another embodiment.

FIG. 11A illustrates a front view of the powered bishop 502 in the conventional mode, without the indicator 1008, according to another embodiment. FIG. 11B illustrates a front view of the powered bishop 502 in the powered mode, with the indicator 1008 exposed due to the activation of the toggle switch 1004 (not shown) along the upward/downward 1006, according to another embodiment.

In one configuration, the switching member 1002 includes the indicator 1008 without the toggle switch 1004. In the illustrated embodiment, the indicator 1008 is the color band. As shown, the color band is applied over the outer surface of the powered bishop 502 to indicate the state of the powered bishop 502 in an enabled/disabled mode during the modified chess game. It should be noted that the color band over the powered bishop 502 can be applied before the start of the game or during the game, depending upon the proficiency level of play of the players. In one configuration, a light-emitting diode (LED) color band is stuck over an outer surface of the powered bishop 502 to represent that the power mode is enabled during the game. The LED color band which is made up of flexible material (e.g., plastic) includes a circuit board that is integrated with LEDs to blow light of a variety of colors and brightness. The LED color band may receive electric power from a battery (e.g., a lithium-ion battery) disposed within the body of the powered bishop 502. A switch is provided to turn on/off the power supply. When the powered bishop 502 operates in the power mode, the player can switch ON the power supply to turn ON the LED light. Alternatively, the player can switch OFF the power supply to turn OFF the LED light, indicating that the powered bishop 502 is operating in the conventional mode.

In another configuration, a removal color band may be used to wrap over the outer surface of the powered bishop 502. The removal color band is made up of elastic material such as rubber, silicon, etc., that can be wrapped/removed easily by the player. In a non-limiting example, the first player 202 wrapped the color band over the bishop piece 502 to indicate that the piece is operating in the power mode. Alternatively, the first player 202 removes the color band from the bishop piece 502, which indicates that the bishop piece 502 is operating in the conventional mode. It should be noted that the first and second players 202 and 204 can wrap/remove the color band piece before the start of the game or during the game, depending upon the level of play opted by the first and second players 202 and 204.

In yet another configuration, permanent color band may be applied over the outer surface of the powered bishop 502 during manufacturing for indicating that the powered bishop 502 is in power mode. A paint/dye of suitable thickness may be sprayed at least over the part of the powered bishop 502 (e.g., at the base). The color of the paint of the color band is different from the color of the rest of the body of the powered bishop 502 whereas the pieces to be used for conventional mode are painted of a single color and no color band is painted. Therefore, the paint of the color band of the conventional and the powered mode can be distinguished while playing the modified chess game. Further, color band of the toggle switch 1004 of other powered pieces such as the powered knight 602, the powered rook 702, and the powered pawn 802 is similar to the color band of the toggle switch 1004 of the powered bishop 502 which is already explained above, and therefore they are not reiterated again for the sake of brevity.

Furthermore, markings can be done on the powered bishop 502 to indicate that the powered piece is in power mode, by using snugly fitting O-rings or base caps. Such O-rings or base caps are made of flexible materials, such as molded rubber or silicon. The main disadvantage of using O-rings or base caps is that there are more chances to be misplaced, hence the built-in mechanisms are preferred over such attachments.

Figure 12:
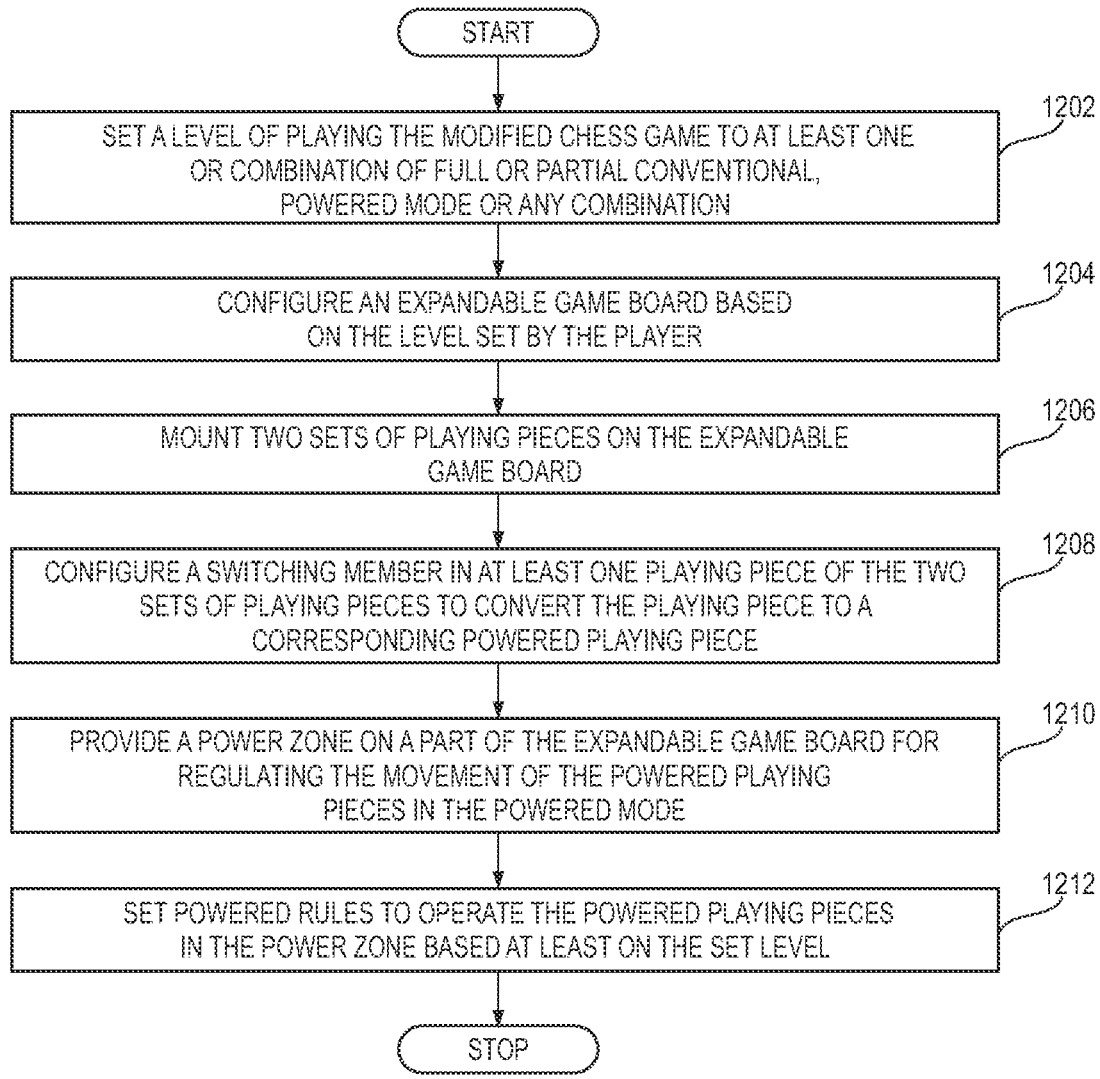
FIG. 12 illustrates a flow chart of a method for playing the modified chess game, in accordance with an embodiment of the present disclosure.

FIG. 12 illustrates a flow diagram of a method 1200 for playing a modified chess game, in accordance with an embodiment of the present disclosure. It should be noted that the sequence of steps of the method 1200 may not be necessarily executed in the same order as they are presented. Further, one or more steps may be grouped and performed in the form of a single step, or one operation may have several sub-steps that may be performed in a parallel or a sequential manner. It should be noted that the method 1200 of FIG. 12 includes the method for playing a modified chess game with players of different proficiency levels. Moreover, it should be noted that the FIGS. 12 to 15 are explained using the apparatus 100 of the present disclosure, as depicted in FIGS. 1 to 11.

In step 1202, the method 1200 sets a level of playing the modified chess game to at least one or combination of full or partial conventional and/or powered modes. As explained above, the conventional chess game weakens the performance of the lesser skilled player, while the modified chess game empowers the weaker player by including the level of playing full or limited powered chess, but the stronger player may choose the level that includes playing in the conventional mode. In the non-limiting embodiment, the players 202 and 204 may agree before the modified chess game about what kind of varying levels of powered and conventional mode combination to be used in the modified chess game. The present disclosure allows the players of unequal strength, such as, between parent and child, beginner and advance player, among masters of varying skills and even between computers and humans, to enjoy the game.

In step 1204, the method 1200 configures the expandable game board 102 based on the set level of playing the modified chess game. The expandable game board 102 includes the expansion mechanism configured to alter at least one file of the set of files 108 and/or at least one rank of the set of ranks 110. The expansion mechanism of the expandable game board 102 adapted to alter the one or more files and/or the one or more ranks is already explained in detail with reference to FIG. 3, and therefore not reiterated again for the sake of brevity.

In step 1206, the method 1200 mounts two sets of playing pieces 104 and 106 visually distinguished from each other on the expandable game board 102. Each set of playing pieces 104 and 106 includes one queen 112, one king 114, at least two bishops 116, at least two knights 118, at least two rooks 120, and at least eight pawns 122. The geometrical configuration and the position of these playing pieces (e.g., 104 and 106) on the specified square of the expandable game board 102 are already explained in detail with reference to FIG. 1, and therefore not reiterated again for the sake of brevity.

In step 1208, the method 1200 includes configuring a switching member in each playing piece to convert the playing piece to a corresponding powered playing piece. In an embodiment of the invention, the switching member 1002 includes a toggle switch 1004 and an indicator 1008. The indicator is used to indicate and differentiate the powered playing piece from the conventional playing piece. The toggle switch 1004 can be activated to expose the indicator during the powered mode. In one embodiment of the invention, activation of a toggle switch 1004 of a switching member 1002 disposed within each playing piece, for example in the at least two bishops 116, the at least two knights 118, the at least two rooks 120, and the at least eight pawns 122 of at least one set of the two sets 104 and 106 of the playing pieces, is to convert the playing piece to a corresponding powered playing piece. The toggle switch 1004 disposed within one or more playing pieces of sets 104 and 106 includes the color band for indicating powered mode of the playing pieces. The functionality of the toggle switch 1004 is already explained in detail with reference to FIG. 10, and therefore they are not reiterated again for the sake of brevity.

In step 1210, the method 1200 provides the power zone 402 on the part of the expandable game board 102 for regulating the movement of the powered playing pieces in the powered mode. The power zone 302 is adapted to alter the playing rules of the playing pieces 104 and 106. An example scenario depicting the part of the expandable game board 102 constructed as a rectangular strip that covers two middle ranks 404 and 406 distinguished from the rest of the files of the expandable game board 102 is illustrated in FIG. 4. The power zone 402 includes one of the at least one file, the at least one rank, or any combination thereof.

In step 1212, the method 1200 includes setting of the powered rules to operate the powered playing pieces in the power zone 402 based at least on the set level. The powered rules to operate the powered playing pieces viz. the powered bishop 502, the powered knight 602, the powered rook 702, and the powered pawn 802 are already explained in detail with reference to FIGS. 5 to 8, and therefore they are not reiterated again for the sake of brevity.

Figure 13:
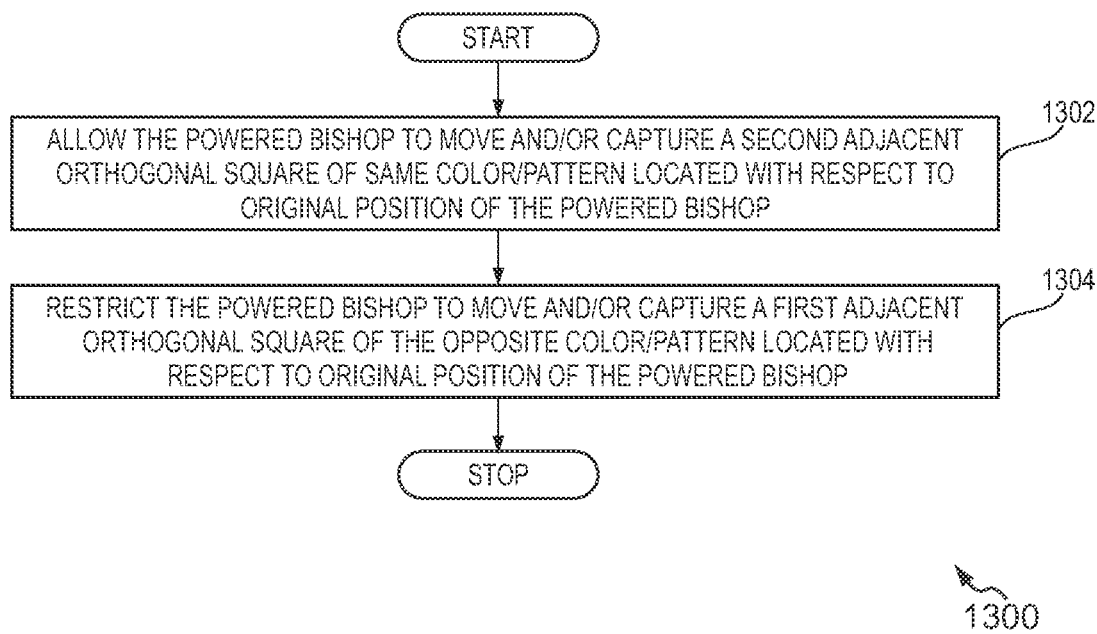
FIG. 13 illustrates a flow diagram of a method for setting powered rules to operate the powered bishop, in accordance with an embodiment of the present disclosure.

FIG. 13 illustrates a flow diagram of a method 1300 for setting the powered rules to operate the powered bishop 502, in accordance with an embodiment of the present disclosure. It should be noted that the sequence of setting the powered rules of the method 1300 may not be necessarily executed in the same order as they are presented. Further, one or more steps may be grouped and performed in the form of a single step, or one step may have several sub-steps that may be performed in a parallel or a sequential manner. The method 1300 starts at step 1302.

In step 1302, the method 1300 allows the powered bishop 502 to move and/or capture a second adjacent orthogonal square of the same color/pattern located with respect to the original position of the powered bishop 502.

In step 1304, the method 1300 restricts the powered bishop 502 to move and/or capture a first adjacent orthogonal square of the opposite color/pattern located with respect to the original position of the powered bishop 502. The steps 1302 and 1304 are already explained in detail with reference to FIG. 5, and therefore they are not reiterated again for the sake of brevity.

Figure 14:
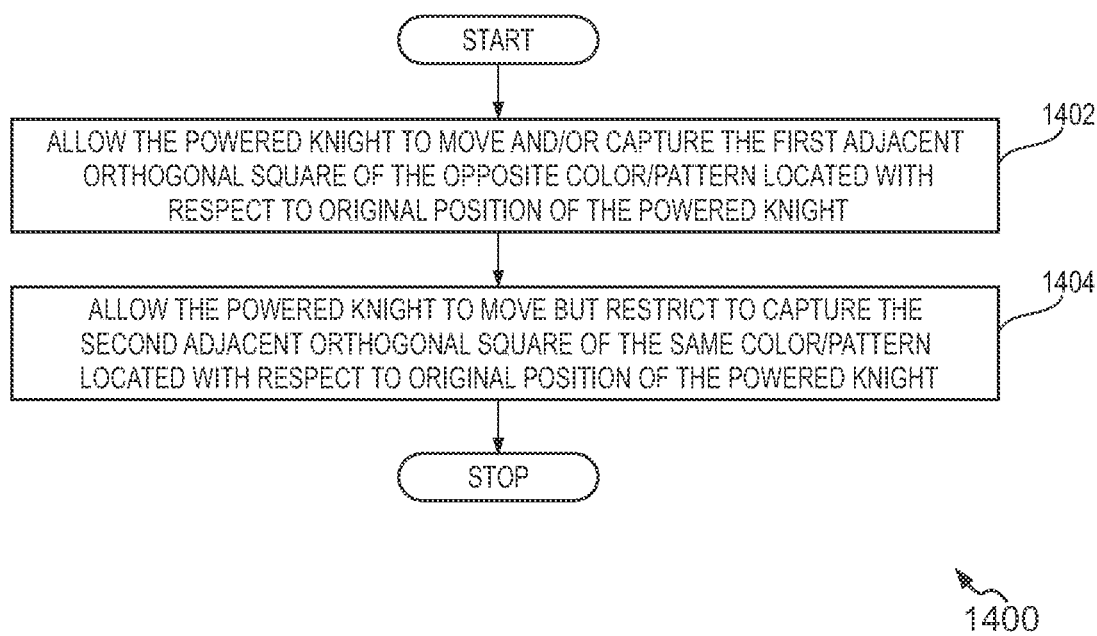
FIG. 14 illustrates a flow diagram of a method for setting the powered rules to operate the powered knight, in accordance with an embodiment of the present disclosure.

FIG. 14 illustrates a flow diagram of a method 1400 for setting the powered rules to operate the powered knight 602, in accordance with an embodiment of the present disclosure. It should be noted that the sequence of setting the powered rules of the method 1400 may not be necessarily executed in the same order as they are presented. Further, one or more steps may be grouped and performed in the form of a single step, or one step may have several sub-steps that may be performed in a parallel or a sequential manner. The method 1400 starts at step 1402.

In step 1402, the method 1400 allows the powered knight 602 to move and/or capture the first adjacent orthogonal square of the opposite color/pattern located with respect to the original position of the powered knight 602.

In step 1404, the method 1400 allows the powered knight 602 to move but not restricted to capture the second adjacent orthogonal square of the same color/pattern located with respect to the original position of the powered knight 602. The steps 1402 and 1404 are already explained in detail with reference to FIG. 6, and therefore they are not reiterated again for the sake of brevity.

Figure 15:
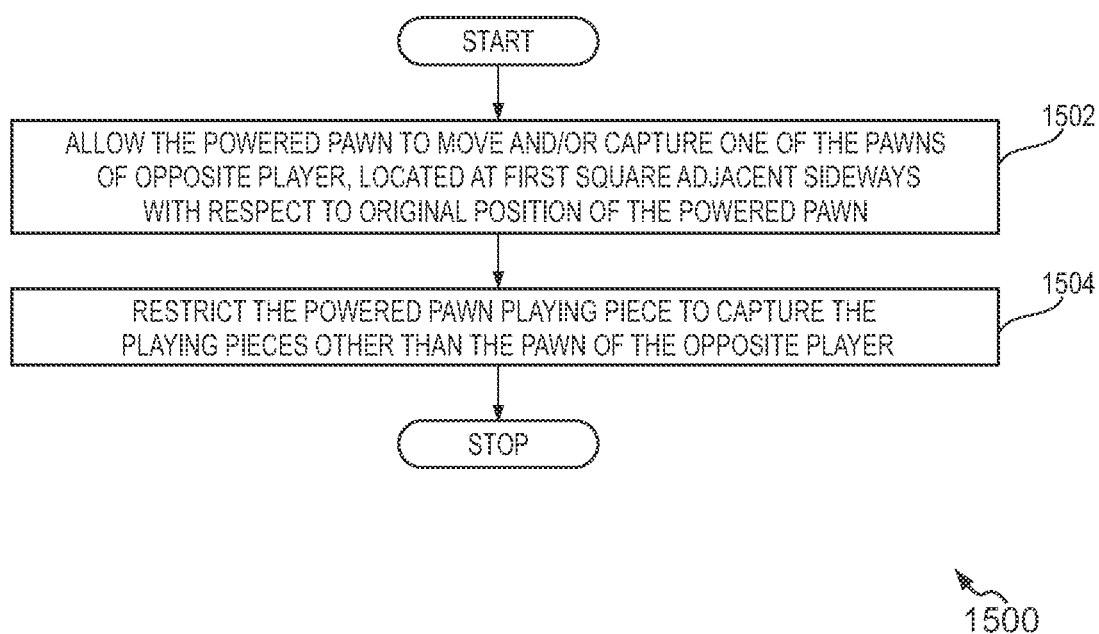
FIG. 15 illustrates a flow diagram of a method for setting the powered rules to operate the powered pawn, in accordance with an embodiment of the present disclosure.

FIG. 15 illustrates a flow diagram of a method 1500 for setting the powered rules to operate the powered pawn 802, in accordance with an embodiment of the present disclosure. It should be noted that the sequence of setting the powered rules of the method 1500 may not be necessarily executed in the same order as they are presented. Further, one or more steps may be grouped and performed in the form of a single step, or one step may have several sub-steps that may be performed in a parallel or a sequential manner. The method 1500 starts at step 1502.

In step 1502, the method 1500 allows the powered pawn 802 to move and/or capture one of the pawns of the opposite player, located at the first square adjacent sideways with respect to the original position of the powered pawn 802.

In step 1504, the method 1500 includes restricting the powered pawn 802 playing piece to capture the playing pieces other than the pawn of the opposite player. The steps 1502 and 1504 are already explained in detail with reference to FIG. 8, and therefore they are not reiterated again for the sake of brevity.

It should be noted that, the powered rules to operate a powered rook includes losing power to capture when moving like a rook, but gaining conventional knight and bishop movements. Further, the powered rules to operate the king includes retaining conventional mode movements of the king and restricting threaten or checkmate of the king by the powered playing pieces of opposite player. The powered rules to operate the queen includes retaining the conventional mode movement of the queen and providing immunity from capture by a powered knight and a powered bishop of the opposite player. The powered rules to operate two sets of playing pieces other than the king and the queen includes capturing only while entering or leaving from the power zone. Further, the powered rules to operate a powered bishop and a powered knight includes allowing to move, but not allowing to capture outside the power zone.

Thus, the apparatus for playing modified game introduces a new way to play chess that provides more tactics and strategy, while improving or sharpening skills to play conventional chess. Further, the apparatus promotes chess games where players rely more on creativity and less on database access, which predisposes to more drawn games. Thus, a variety in chess games without shuffling the start-up position while staying close to conventional chess play is achieved. Further, the modified chess game encourages the younger players to take up chess and sustain their interest to reap the benefit of organized thinking habits.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An apparatus for playing a modified chess game with players of different proficiency levels, the apparatus comprising:
    an expandable game board configured to operate in at least one of a conventional mode and a powered mode;
    two sets of playing pieces, visually distinguished from each other, configured to be mounted at the expandable game board;
    a switching member in at least one playing piece of the two sets of playing pieces, the switching member of a playing piece configured to convert the playing piece to a powered playing piece in the powered mode; and
    a power zone configured at least on a portion of the expandable game board to regulate movement of powered playing pieces based on a set of powered rules.

2. The apparatus of claim 1, wherein the expandable game board comprises at least eight files and at least eight ranks, adapted to form a set of equally spaced, alternatingly patterned squares.

3. The apparatus of claim 2, wherein the expandable game board comprises an expansion mechanism configured to alter a number of at least one of: files and ranks for playing the modified chess game.

4. The apparatus of claim 1, wherein each set of playing pieces comprises one king, one queen, at least two bishops, at least two knights, at least two rooks, and at least eight pawns.

5. The apparatus of claim 4, wherein each of the at least two bishops, the at least two knights, the at least two rooks, and the at least eight pawns of at least one set of the two sets of playing pieces comprises the switching member comprising:
    an indicator for indicating the powered playing piece; and
    a toggle switch, activated to expose the indicator in the powered mode.

6. The apparatus of claim 5, wherein the powered playing pieces are operated based on the set of powered rules by:
    allowing a powered bishop to move or capture a second adjacent orthogonal square of same pattern located with respect to original position of the powered bishop;
    restricting the powered bishop to move or capture a first adjacent orthogonal square of opposite pattern located with respect to the original position of the powered bishop;
    allowing a powered knight to move or capture the first adjacent orthogonal square of the opposite pattern located with respect to original position of the powered knight;
    allowing the powered knight to move but restricting to capture the second adjacent orthogonal square of the same pattern located with respect to the original position of the powered knight;
    allowing a powered pawn to move or capture one of the pawns of opposite player, located at first square adjacent sideways with respect to original position of the powered pawn; and
    restricting the powered pawn playing piece to capture the playing pieces other than the pawn of the opposite player.

7. The apparatus of claim 1, wherein at least one of the two sets of playing pieces is operated remotely, to play the modified chess game using at least one electronic device.

8. The apparatus of claim 7, wherein each playing piece comprises a controller for controlling at least one physical movement of the playing piece mounted on the expandable game board based on at least one remote movement of the playing piece performed on the at least one electronic device.

9. The apparatus of claim 8, wherein each playing piece comprises:
    a sensing element for sensing the at least one physical movement of the playing piece mounted on the expandable game board; and
    a network unit for transmitting the sensed at least one physical movement of the playing piece to the at least one electronic device,
    wherein position of the playing piece displayed on the at least one electronic device is updated based on the sensed at least one physical movement.

10. A method for playing a modified chess game with players of different proficiency levels, the method comprising:
    setting a level of playing the modified chess game to at least one or combination of full or partial conventional, powered mode or any combination thereof;
    configuring an expandable game board based on the level set by a player;
    mounting two sets of playing pieces visually distinguished from each other on the expandable game board;
    configuring a switching member in at least one playing piece of the two sets of playing pieces, the switching member of a playing piece converts the playing piece to a corresponding powered playing piece;
    providing a power zone on a part of the expandable game board, distinguished from rest of squares of the expandable game board, for regulating movement of powered playing pieces in the powered mode, wherein the power zone comprises one of at least one file, at least one rank, or any combination thereof; and
    setting powered rules to operate the powered playing pieces in the power zone based at least on set level.

11. The method of claim 10, wherein each set of playing pieces comprises one king, one queen, at least two bishops, at least two knights, at least two rooks, and at least eight pawns.

12. The method of claim 11, wherein the at least two bishops, the at least two knights, the at least two rooks, and the at least eight pawns of at least one set of the two sets of playing pieces comprise the switching member comprising:
    an indicator for indicating the powered playing piece; and a toggle switch, activated to expose the indicator in the powered mode.

13. The method of claim 12, further comprising:

configuring each playing piece with the toggle switch to switch between conventional mode and powered mode; and activating the toggle switch to expose the indicator in the powered mode.

14. The method of claim 10, further comprising operating at least one of the two sets of playing pieces remotely, to play the modified chess game using at least one electronic device.

15. The method of claim 14, further comprising remotely controlling, by a controller of the at least one of the two sets of playing pieces, at least one physical movement of the playing piece mounted on the expandable game board based on at least one remote movement of the playing piece performed on the at least one electronic device.

16. The method of claim 15, further comprising:

sensing, by a sensing element of the at least one of the two sets of playing pieces, the at least one physical movement of the playing piece mounted on the expandable game board; and transmitting, by a network unit of the at least one of the two sets of playing pieces, the sensed at least one physical movement of the playing piece to the at least one electronic device, wherein the position of the playing piece displayed on the at least one electronic device is updated based on the sensed at least one physical movement.

17. The method of claim 11, further comprising setting the powered rules to operate a powered bishop by:

allowing the powered bishop to move or capture a second adjacent orthogonal square of same pattern located with respect to original position of the powered bishop; and restricting the powered bishop to move or capture a first adjacent orthogonal square of the opposite pattern located with respect to the original position of the powered bishop.

18. The method of claim 11, further comprising setting the powered rules to operate a powered knight by:

allowing the powered knight to move or capture the first adjacent orthogonal square of the opposite pattern located with respect to original position of the powered knight; and allowing the powered knight to move but restricting to capture a second adjacent orthogonal square of same pattern located with respect to the original position of the powered knight.

19. The method of claim 11, further comprising setting the powered rules to operate a powered pawn by:

allowing the powered pawn to move or capture one of pawns of opposite player, located at first square adjacent sideways with respect to original position of the powered pawn; and restricting the powered pawn to capture the playing pieces other than the pawn of the opposite player.

20. The method of claim 11, further comprising setting the powered rules to operate a powered rook by:

losing power to capture when moving like a rook, but gaining conventional knight and bishop movements.

21. The method of claim 11, further comprising setting the powered rules to operate the king by:

retaining conventional mode movements of the king; and restricting threaten or checkmate of the king by the powered playing pieces of opposite player.

22. The method of claim 11, further comprising setting the powered rules to operate the queen by:

retaining conventional mode movement of the queen; and providing immunity from capture by a powered knight and a powered bishop of opposite player.

23. The method of claim 11, further comprising:

setting the powered rules to operate two sets of playing pieces other than the king and the queen by, capturing only while entering or leaving from the power zone; and setting the powered rules to operate a powered bishop and a powered knight by allowing to move, but not allowing to capture outside the power zone.

* * * * *